United States Patent [19]

Wanke

[11] 3,936,606
[45] Feb. 3, 1976

[54] ACOUSTIC ABATEMENT METHOD AND APPARATUS

[76] Inventor: Ronald L. Wanke, 1960 N. Lincoln Park West, Chicago, Ill. 60614

[22] Filed: Dec. 11, 1972

[21] Appl. No.: 313,958

Related U.S. Application Data

[63] Continuation-in-part of Ser. No. 205,598, Dec. 7, 1971, abandoned.

[52] U.S. Cl................................ 179/1 P; 181/33 L
[51] Int. Cl.²......................................... H04R 1/28
[58] Field of Search ......... 179/1 P; 181/33 L, 33 H, 181/33 HA, 33 HB

[56] References Cited
UNITED STATES PATENTS

| | | | |
|---|---|---|---|
| 2,043,416 | 6/1936 | Lueg.................... | 179/1 P |
| 2,048,508 | 7/1936 | Mallina................ | 179/113 |
| 2,798,121 | 7/1957 | Rowe et al............ | 179/113 |
| 2,983,790 | 5/1961 | Olson................... | 179/1 P |
| 3,185,778 | 5/1965 | Giannini et al....... | 179/113 |
| 3,602,331 | 8/1971 | Bschorr................ | 179/1 P |
| 3,685,610 | 8/1972 | Bschorr................ | 181/33 C |
| 3,693,749 | 9/1972 | Motsinger et al..... | 181/33 F |
| 3,826,870 | 7/1974 | Wurm et al........... | 181/33 L |

OTHER PUBLICATIONS
J. C. Bleazey, "Electronic Sound Absorber" Journal of the Aud. Eng. Soc., Vol. 10, No. 2, Apr. 1962 pp. 135–139

Olson "Electronic Control of Noise . . .", Journal of the Acoustical Soc. of Amer. Vol. 28 No. 5, Sept. 1956 pp. 966–972

E. J. Richards et al., "Noise and Acoustic Fatigue in Aeronautics" John Wiley & Sons, 1968 Chap. 2 pp. 43–57

Primary Examiner—Douglas W. Olms

[57] ABSTRACT

An acoustic receiver, amplifier and transmitter generate an anti wave which is in-phase and of mirror symmetry with respect to a propagating acoustic wave. Coherent propagation means such as an acoustic duct of particular dimensions redirects and/or converts the acoustic wave and the anti wave, which otherwise propagate with incremental wavefronts at different vectors, into plane waves which are superimposed to create wave interference which itself propagates. For noise of high sound pressure level such as created by a gas turbine engine, the acoustic transmitter comprises a modulated gas flow speaker coupled to one or more bleed ports which supply gas at one or more pressures offset from ambient pressure.

39 Claims, 19 Drawing Figures

FIG.2A APPLICANT'S SYSTEM

FIG.2C APPLICANT'S SYSTEM

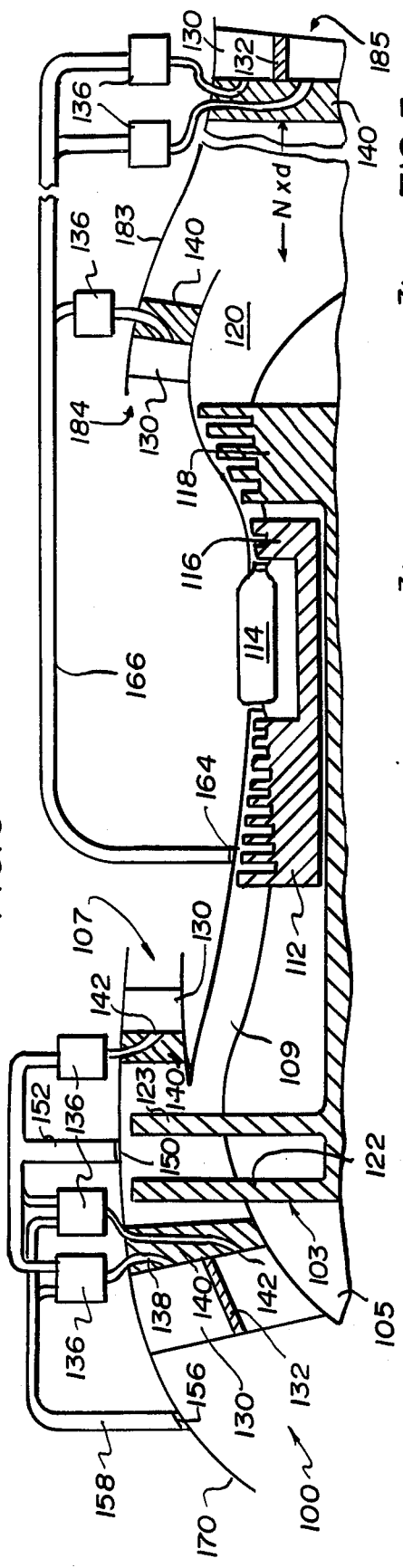
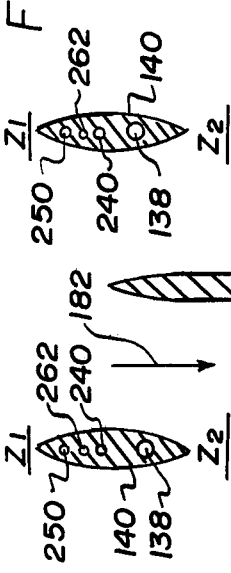
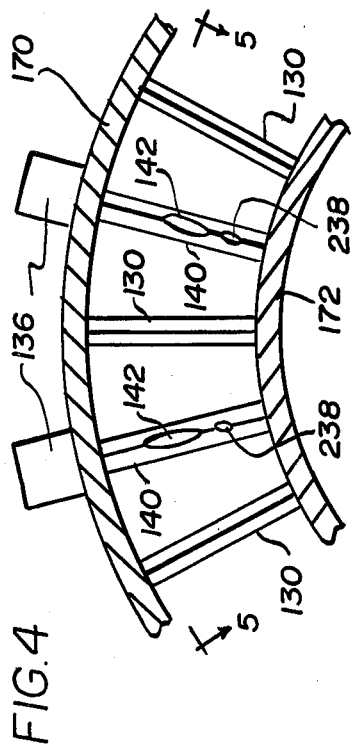

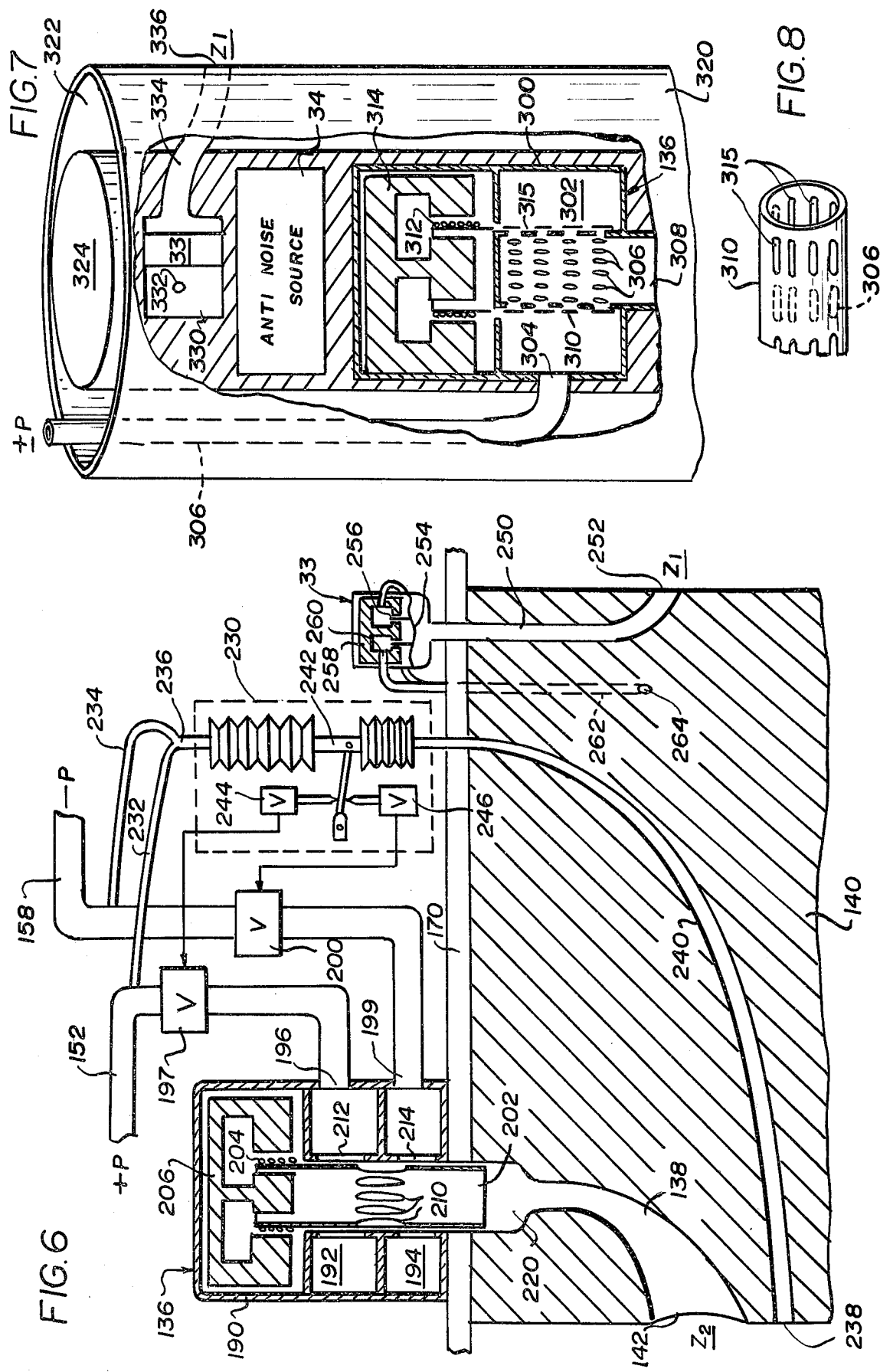

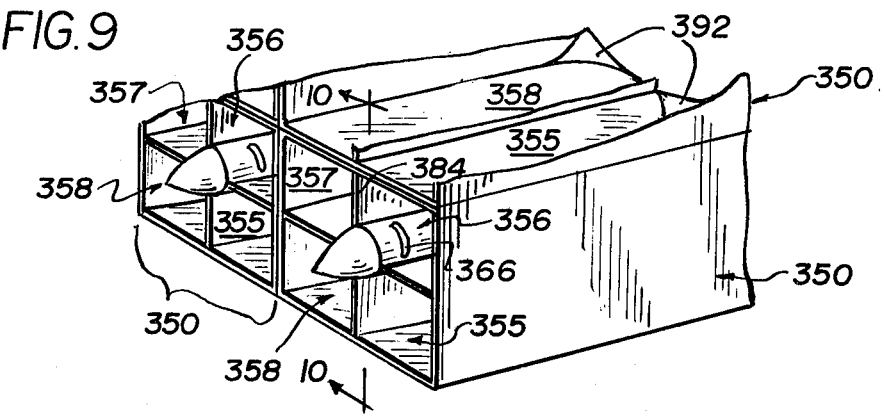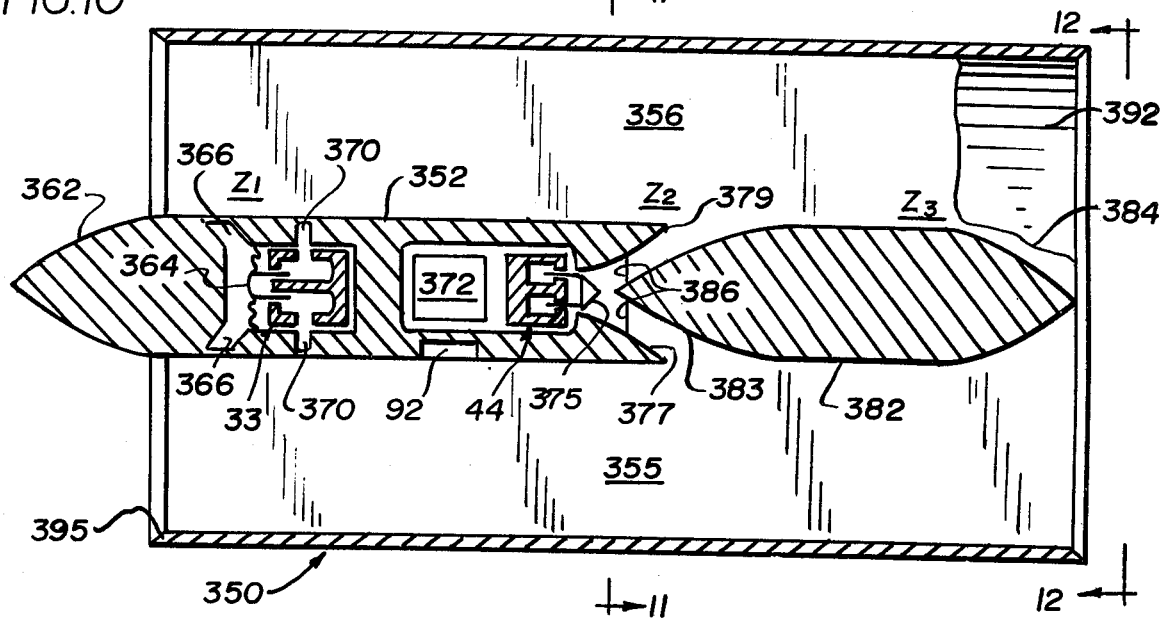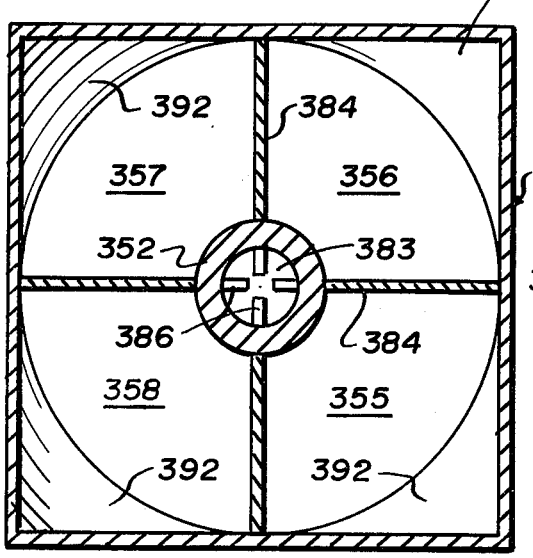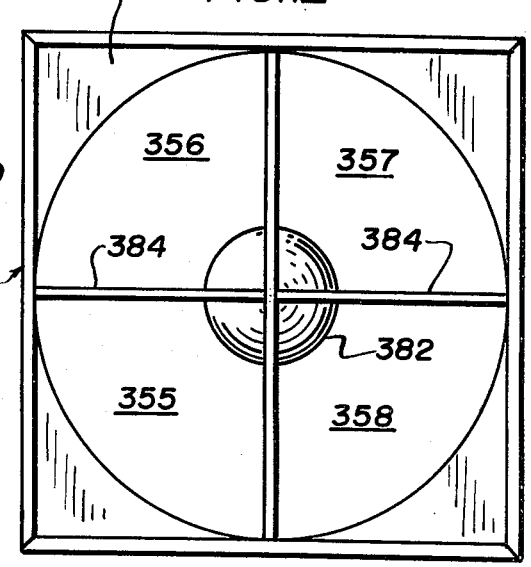

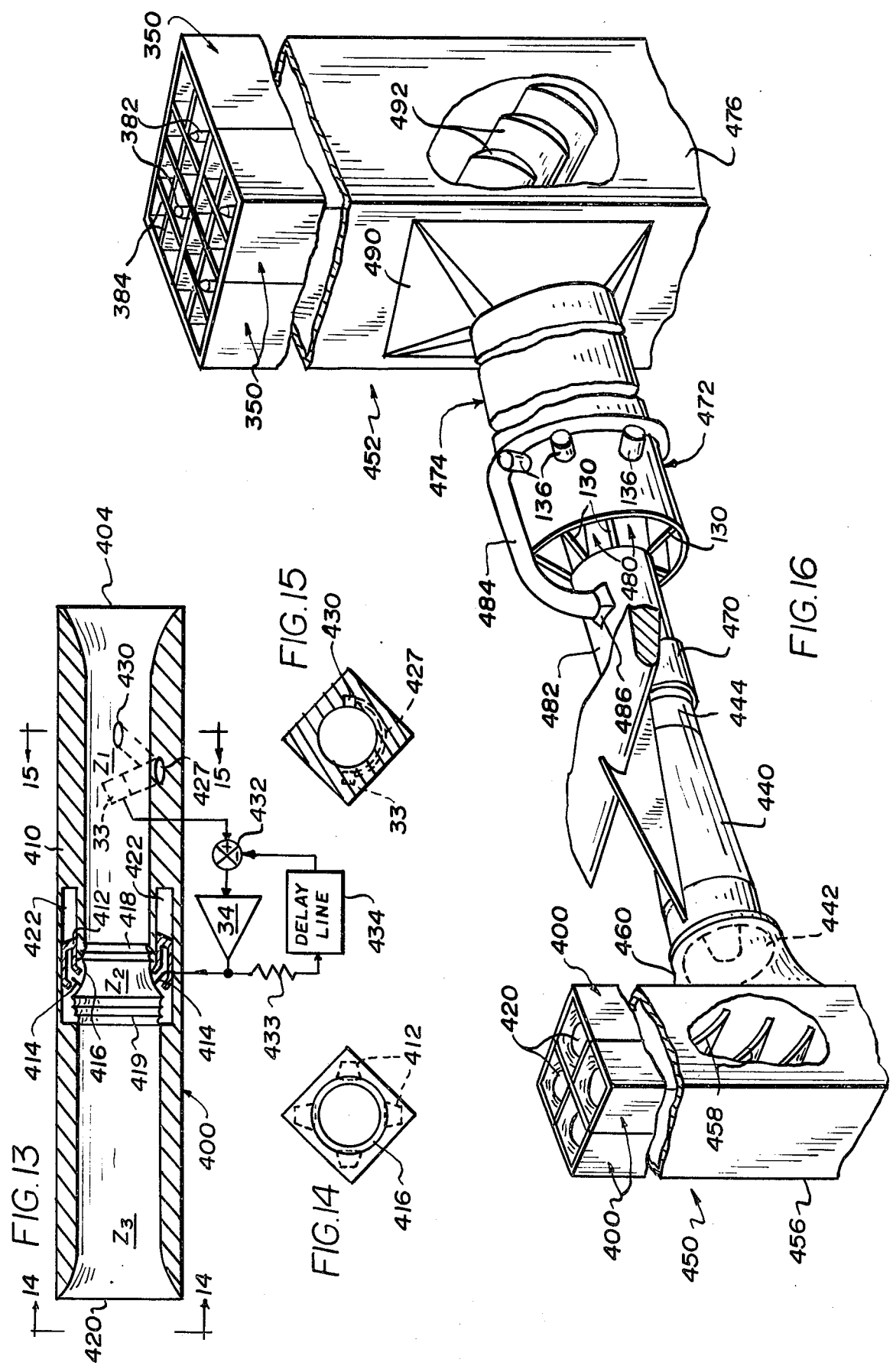

ACOUSTIC ABATEMENT METHOD AND APPARATUS

CROSS-REFERENCE TO RELATED APPLICATIONS

This application is a continuation-in-part of my copending application entitled "Acoustic Control System," Ser. No. 205,598, filed Dec. 7, 1971, now abandoned.

BACKGROUND OF THE INVENTION

This invention relates to acoustical apparatus and methods for reproducing acoustic waves with desired patterns.

The most common methods for abating sound energy involve various passive techniques such as the mechanical process of blocking acoustic energy, or the processes of converting acoustic energy into a different form such as heat energy or to a different frequency. These approaches have limited success when the medium propagating the acoustic energy must be allowed to pass freely with only the acoustic energy being dissipated. Theoretically, more complete attenuation could be provided by an active system which supplied an additional amount of energy sufficient to cancel the acoustic energy. Attempts to provide a practical active attenuation system, by using the known principle of wave interference, have been uniformly disappointing.

Many experimentors have attempted to generate, for the purposes of wave interference, an anti wave which is 180° out-of-phase with respect to an acoustic wave. While this technique will cancel the intermediate portion of a pure sine wave over an extremely limited zone in space, the theoretical and practical deficiencies of such a technique have not been recognized. A 180° phase shift system will not cancel the first half cycle of an acoustic wave, nor the last half cycle of a locally generated anti wave. When the acoustic wave has a non-symmetrical pressure variation, a 180° phase shift does not cancel the acoustic wave but in fact adds to the total objectionable sound energy.

Complete cancellation by wave interference, even for a limited zone in space, requires the use of an anti wave whic is in-phase and of mirror symmetry with respect to the acoustic wave to be cancelled. A few experimenters have recognized this principle, but have been unable to provide apparatus or methods capable of generating the proper antiwave. For example, it has been known to mount movable diaphragms for a microphone and for a loudspeaker in the same plane, and drive them oppositely. Such systems have not recognized the inherent time delays occurring in the energy conversion processes occurring in the microphone and the loudspeaker.

All prior attempts to provide an active cancellation system have generated an anti wave with one or more vectors of propagation at an angle to the vectors of propagation of the acoustic wave. While some cancellation may be produced where the two waves cross in space, both waves continue to propagate and at other points in space create more objectionable noise than existed in the original acoustic wave alone. The presence of walls may reflect these waves back into the limited cross-over zone, nullifying the effect of the original cancellation. Furthermore, the housings for the anti noise apparatus have themselves altered and scattered the acoustic wave propagation pattern, making any significant attenuation virtually impossible. As a result of all of these factors, prior active cancellation systems for acoustic energy have generally been of no practical or commercial use.

The suppression of sound noise created by an air breathing engine such as a gas turbine engine has been given extensive consideration. Separate noise abatement methods have evolved to solve the problems of pure jet noise, which may be characterized as originating external to the engine, and internally generated noise produced by rotating machinery such as the compressor, fan, and turbine. Noise abatement methods for internally generated noise generally concern acoustic treatment of the inlet duct, the fan outlet duct, and noise reduction at the compressor/fan source. Also utilized is the choked intake in which a stowed vane, inflatable diaphragm, or other flow restriction device is deployed so that air in an inlet reaches sonic velocity (Mach number near or greater than 1). While these devices produce some reduction over certain solid angles, the presence of movable structures in the intake is undesirable. Furthermore, this technique cannot be used to silence a fan outlet in which the noise is travelling with the air stream.

Compressor/fan noise generated by interaction of the rotor blades and stator vanes is in the form of spinning modes of one or more lobe patterns which propagate through the compressor inlet duct. The nature of compressor noise and many methods for suppressing such noise are based on the work of J. M. Tyler and T. G. Sofrin, see particularly "Axial Flow Compressor Noise Studies" appearing in SAE Transactions, 1962, pages 309–332, and U.S. Pat. No. 3,194,487 granted July 13, 1965. Such noise abatement techniques include selecting and indexing the blade and vane combinations such that spinning modes of equal intensity and 180° out-of-phase will alledgedly cancel in the duct. Even when particular blade/vane combinations are physically realizable in a practical compressor, imperfect speed control and differences in radial distributions of the modes result in incomplete cancellation. Altering of the duct cut-off frequency in order to suppress discrete noise above the duct cut-off frequency has also been attempted.

While prior abatement methods have in fact reduced objectionable noise, the amount of reduction has been disappointing, especially in view of the logarithmic nature of human hearing. Equally important, desired aerodynamic properties for the engine often must be compromised in order to incorporate the noise abatement techniques. It would be desirable to aerodynamically design a compressor, fan, and turbine irrespective of noise considerations, and abate any resulting noise by techniques which do not to any significant degree restrict air flow, alter the efficiency of the engine, or require moving parts in the inlet/outlet ducts.

SUMMARY OF THE INVENTION

In accordance with the present invention, the disadvantages of prior methods and apparatus as discussed above have been overcome. To cancel a sound wave, an inphase anti wave of the same absolute magnitude and mirror symmetry is locally generated. The sound wave and the anti wave are superimposed with substantially identical incremental wavefronts, so that the cancellation effect itself propagates coherently with the propagating acoustic wave. For this purpose, both waves may be confined within an acoustic tube or duct having a cross sectional area selected to suppress all but plane waves having a (0,0) acoustic mode. The fluid medium can freely flow in either direction through the duct.

When the acoustic wave to be cancelled has a high energy content, the anti wave is generated by a modulated gas flow speaker which operates at a pressure offset from the ambient pressure of the gas medium in the duct. The speaker may modulate a unidirectional flow stream having a pressure offset from ambient, or may modulate a pair of flow streams combined to have a pressure selectively controllable above and below ambient pressure.

To abate aerodynamic noise from a gas turbine engine or other heat engine which creates a pressure gradient, anti noise ducts are located in the inlet and outlet air flow openings for the engine. Power for the modulated gas flow speaker which generates the anti waves is supplied by air from a bleed port.

The anti noise ducts, incorporating either a modulated gas flow speaker or a dynamic loudspeaker, may be incorporated in a ground muffler or noise suppressor/silencer useful for maintenance and testing of a jet engine. An intake suppressor supplies air, with negligible thrust loss, to a jet engine intake. An outlet suppressor, which produces no back pressure on the engine, vents the jet exhaust to the atmosphere. These suppressors can be used for any muffler application in which sound energy is to be abated while allowing free flow of the sound carrier medium, and thus are useful for ground pens and hangars as well as general sound abatement applications not associated with aerodynamic noise.

One object of this invention is the provision of a method and apparatus for sound cancellation by generating an in-phase, mirror symmetry, interference wave and by superimposing corresponding incremental wavefronts of the interference wave and the propagating sound wave to be cancelled.

Another object of this invention is the provision in an air breathing engine such as a gas turbine engine of a source of electric signals coupled to a modulated gas flow speaker for modulating an air stream supplied from a bleed port of the engine to produce a mirror symmetry wave which cancels externally generated noise, and internally generated noise produced by rotating machinery, or to produce acoustic waves for other purposes.

Still a further object of this invention is the provision in a sound abatement system of an acoustic duct having dimensions which confine and redirect a pair of simultaneously propagating sound waves into the form of a pair of superimposed plane waves each of (0,0) acoustic mode.

While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated. For example, while one embodiment is illustrated in conjunction with a turbofan engine having a high bypass ratio, the apparatus is equally adaptable for use with turbojet and turboshaft engines. The apparatus is also usable to reduce the noise of a shrouded propeller or other rotating machinery incorporating rotating blades and stationary vanes and struts. This includes all forms of compressors, turbine, pumps, and heat engines. Further objects and features of the invention will be apparent from the following description, and from the drawings.

BRIEF DESCRIPTION OF THE DRAWINGS

FIGS. 2A, 2B, 2C and 2D are waveform diagrams showing acoustic pressure variations versus time at three locations in space, wherein FIGS. 2A and 2C show wave-forms produced by the applicant's noise attenuation system of FIG. 1 and FIGS. 2B and 2D show waveforms produced by prior noise attenuation systems;

FIG. 3 is a cross-section of part of a turbofan engine in which each air opening includes a plurality of anti noise ducts each constructed in accordance with FIG. 1;

FIG. 4 is a plan view of two anti noise ducts associated with any of the air openings in the turbofan engine shown in FIG. 3;

FIG. 5 is a cross-sectional view taken along lines 5—5 of FIG. 4;

FIG. 6 is a sectional view of an ambient modulated gas flow speaker mounted external to the anti noise duct of FIGS. 3 and 4;

FIG. 7 is a sectional view of an offset modulated gas flow speaker mounted within a vane located in an anti noise duct;

FIG. 8 is a perspective view of a slotted armature or diaphragm for the offset modulated gas flow speaker shown in FIG. 7;

FIG. 9 is a perspective view, partly in section, of a plurality of stacked anti noise sources each incorporating one acoustic transmitter for a plurality of surrounding anti noise ducts;

FIG. 10 is a cross-sectional view taken along lines 10—10 of FIG. 9 and illustrating a center section of one anti noise source;

FIG. 11 is a rear looking plan view of a complete anti noise source, taken along lines 11—11 of FIG. 10;

FIG. 12 is a front looking plan view of a complete anti noise source, taken along lines 12—12 of FIG. 10;

FIG. 13 is a partly cross-sectional and partly schematic view of a modified anti noise source in which a single acoustic transmitter serves one anti noise duct;

FIG. 14 is a plan front view of a complete anti noise source, taken along lines 14—14 of FIG. 13;

FIG. 15 is a rear cross-sectional view of a complete anti noise source taken along lines 15—15 of FIG. 13; and FIG. 16 is a perspective view of a ground muffler/silencer for a jet engine.

GENERAL OPERATION

Figure 1:
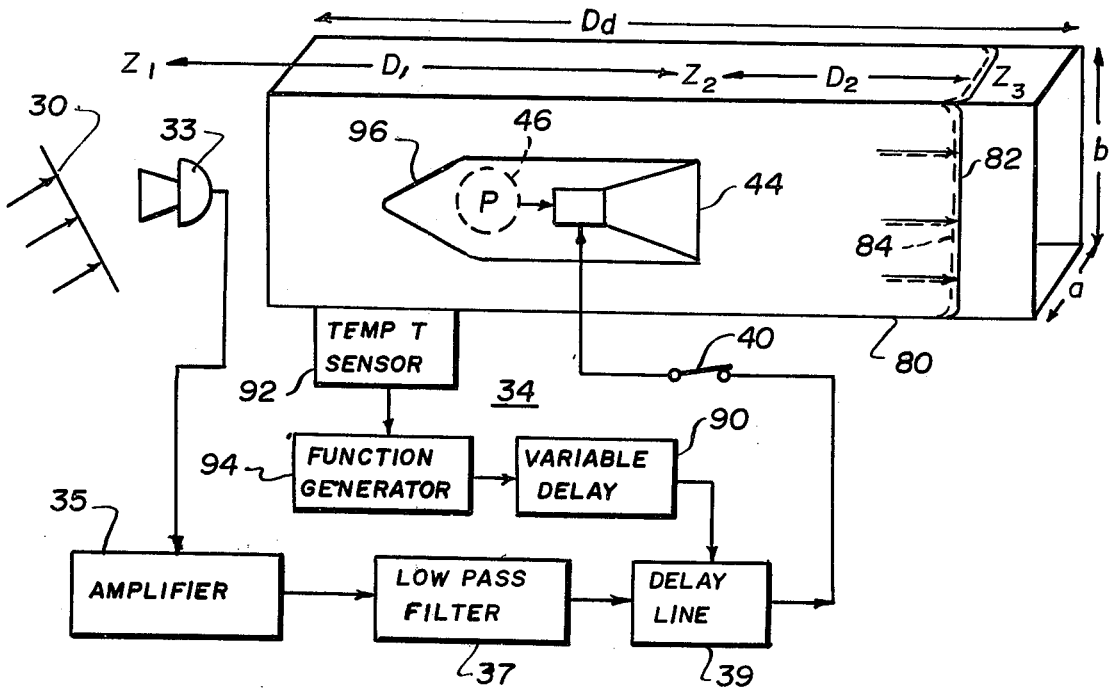
FIG. 1 is a partly block and partly schematic diagram of a novel method and apparatus for attenuating acoustic noise by use of wave interference.
Figure 1:
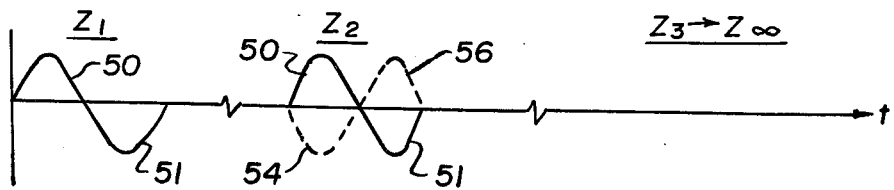

FIG. 1 illustrates a method and apparatus for cancelling an acoustic wave having a wavefront 30 propagating through an elastic medium such as air and having a vector advance in the direction of the illustrated arrows. An acoustic receiver 33, such as a unidirectional microphone, generates an audio varying output signal representative of the acoustic wave. The signal is coupled to an anti noise source 34 which includes an audio amplifier 35 of predetermined gain. The amplified audio signal from amplifier 35 is coupled to a low pass filter 37 which passes all frequencies below a cut-off frequency $f_c$. The output from low pass filter 37 is coupled through a delay line 39 and a single pole, single throw on-off control switch 40 to an acoustic transmitter 44.

Acoustic transmitter 44 may take the form of a dynamic loudspeaker when the sound pressure level of the acoustic wave to be cancelled is within the relatively low power output capabilities of a dynamic loudspeaker. When high sound pressure levels are to be cancelled, and for use in heat engines having a substantial pressure gradient, the acoustic transmitter 44 preferably takes the form of a modulated gas flow speaker which modulates a primary gas flow from a pump source 46.

Acoustic receiver 33 is located along a Z axis at a position $Z_1$ intersecting the path of the acoustic wavefront 30. Acoustic transmitter 44 is located in a positive direction along the Z axis at a position $Z_2$ which is downstream from the receiver 33 and spaced therefrom by a distance $D_1$. It should be understood that positions $Z_1$ and $Z_2$ are diagramatically illustrated, and represent a mean position on the moving transducer member which converts acoustical energy to electrical energy, or vice versa. The distance $D_1$, the AC gain of amplifier 35, and the time delay produced by delay line 39 are chosen to generate at position $Z_2$ an anti wave which is in-phase and of mirror symmetry with respect to the propagating acoustic wave. This operation may be understood with reference to FIG. 2 which shows four curves of pressure variation, relative to ambient pressure, versus time $t$.

As seen in FIG. 2A, an acoustic wave at position $Z_1$ has a compression half-cycle 50 followed by a rarefaction half-cycle 51. The receiver 33, amplifier 35, intermediate portions of the anti noise system, and the transmitter 44 are connected so that the compression half-cycle 50 generates at position $Z_2$ an anti wave having a rarefraction half-cycle 54. Similarly, the rarefraction half-cycle 51 causes generation at position $Z_2$ of a compression half-cycle 56. The gain of amplifier 35 is selected to produce a system gain of one at a position $Z_3$, that is, the generated anti wave 54,56 has a sound pressure deviation equal in absolute magnitude to the sound pressure deviation of the acoustic wave 50,51 at position $Z_3$. The leading edge of the anti wave 54 coincides with the leading edge of the acoustic wave 50. The anti wave is thus inphase and of mirror symmetry with respect to the external acoustic wave, and hence at some downstream position $Z_3$, the oppositely going pressure variations cancel or nullify due to the interference phenomenon.

In order to generate the phase aligned anti wave, i.e., in-phase with the external acoustic wave, the transmission time for the external acoustic wave to travel in the medium the distance $D_1$ must be equal to the transmission time of the anti noise system. Since there is a time delay in the energy conversion processes at the receiver 33 and the transmitter 44, transmitter 44 must be spaced downstream along the Z axis at a minimum distance from the receiver 33. Therefore, the velocity of propagation through a portion of the anti noise system must be greater than the velocity of propagation of sound in the medium. This is easily accomplished since electrical signals propagate at the velocity of light. However, the applicant's system is not limited to use with electrical conversions, and hence the acoustic transducers and amplifiers may utilize other energy forms following the teachings disclosed herein.

The value of time delay for the delay line 39 is thus selected depending on the distance $D_1$ between the receiver 33 and the transmitter 44, and the relative difference in propagation times between the medium and the energy carrier being utilized in the anti noise system. The delay line 39 can be eliminated entirely, as is often desirable, if the distance $D_1$ is reduced to the above specified minimum distance in which the transmission time in the medium just equals the total delay time in the anti noise system. Phase alignment of the anti wave with the propagating acoustic wave can thus be accomplished by matching the system transmission time with the medium transmission time for the physical distance $D_1$.

Figure 2B:
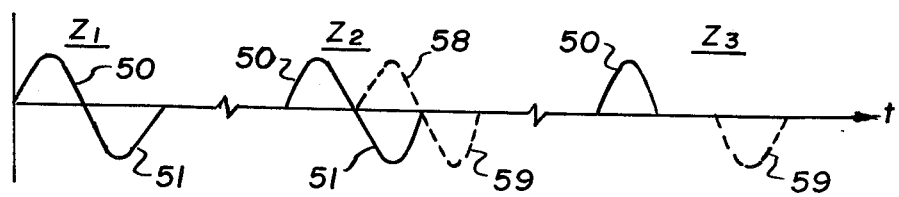
Figure 2B:
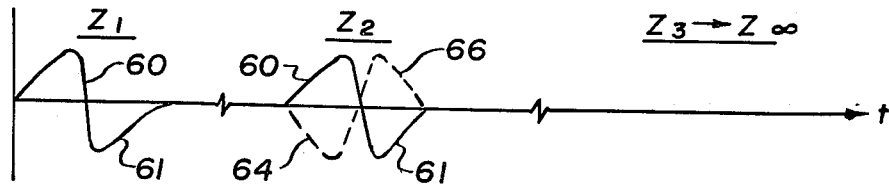

The cancellation possible by generating an inphase anti wave of mirror symmetry is drastically different than a the proported cancellation produced by prior systems which have generated a 180° phase shifted anti wave. As shown in FIG. 2B, a 180° phase shifted wave comprises a compression portion 58 and a rarefraction portion 59. At an interference position $Z_3$, only the intermediate half-cycle is cancelled. Thus a 180° system does not cancel the initial half-cycle 50 of the external acoustic wave, nor the last half-cycle 59 of the anti wave.

Figure 2D:
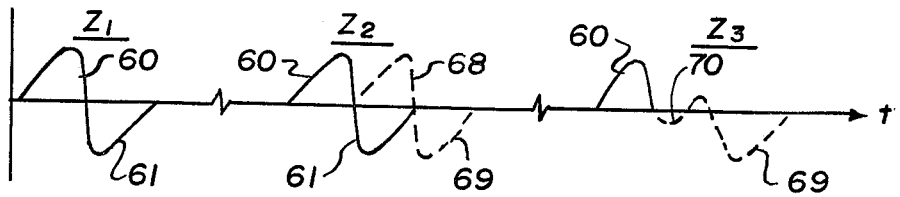

The problem is compounded when the external acoustic wave has a nonsymmetrical wave shape, as shown in FIGS. 2C and 2D. It is known that as a symmetrical acoustic wave of large amplitude propagates through space its wave shape will become nonsymmetrical and will tend toward a sawtooth shape, as illustrated by compression portion 60 and rarefraction portion 61. As seen in FIG. 2C, the applicant's system produces an anti wave consisting of a rarefraction portion 64 and a compression portion 66, each of mirror symmetry with respect to compression portion 60 and rarefraction portion 61, respectively. At a downstream interference point $Z_3$, the equal and opposite waves entirely cancel. This is not true with a 180° phase shift system, as seen in FIG. 2D. Such a system generates a 180° phase shifted anti wave having a compression portion 68 and a rarefraction portion 69. At a downstream interference point $Z_3$, the compression portion 60 is still present, as is the rarefraction portion 69. In addition, wave interference between the non-symmetrical portions 61 and 68 produces a new pressure wave 70 which had not previously existed. The net result at position $Z_3$ is simply to replace the original acoustic noise with a different type of acoustic noise.

In all prior cancellation systems, the external acoustic wave and the locally generated anti wave have both continued to propagate through space with different vectors. This result could not be avoided, because the apparatus for locally generating an anti wave occupies a physical space which therefore cannot be occupied by the propagating acoustic wave. That is, the source of the anti wave and the source of the acoustic wave do not occupy the same position in space. Since the vibratory motion of an elastic medium is longitudinal, i.e., the same direction as the vector advance of the wave, effective cancellation will not occur outside of the zones of wave intersection.

The anti noise system of FIG. 1 includes a coherent propagation means 80 for coinciding the incremental wavefronts of the acoustic wave with corresponding incremental wavefronts of the anti wave to produce a "coherent" cancellation effect which itself propagates through space. As a result, the destructive interference pattern which exists at a downstream point $Z_3$ itself propagates so that pressure nullification exists from position $Z_3$ through infinity $Z_\infty$. Without coherent propagation means 80, the destructive interference phenomenon could exist for only a limited crossover zone in space.

Coherent propagation means 80 may take any form which will superimpose the incremental wavefronts of the acoustic wave and the anti wave, i.e. superimpose all vectors of advance of the waves, in order to produce a cancellation effect which itself propagates until the energy which creates particle motion has dissipated. One form comprises an acoustic tube or duct, of any cross-sectional shape, which confines or redirects the acoustic energy into forms which can be exactly superimposed. This is most easily accomplished by converting both the acoustic wave and the anti wave into the form of a plane wave of (0,0) mode.

To illustrate this principle, duct 80 will be assumed to have a rectangular cross-section of dimensions $a$ along an X axis, $b$ along a Y axis, and an extent $D_d$ along a Z axis, where X, Y and Z are orthogonal axes of a Cartesian coordinate system. As sound propagates in a duct, it is known that the wave particles can be reflected from the walls of the duct, and interference amongst these multiple reflections will result in higher order acoustic modes or patterns of amplitude variations over the X,Y cross-section of the duct. For a given frequency and duct size, only a finite number of modes can be propagated through the duct. The amplitudes of higher order modes (i.e., below the duct cut-off frequency) decay exponentially with distance along the Z axis.

The dimensions $a,b$ and $D_d$ of duct 80 are selected so that only a plane wave of the (0,0) mode can propagate in the Z direction. Thus, a particular pressure gradient of the acoustic wave will assume a perpendicular wavefront 82 as illustrated in FIG. 1. A corresponding pressure gradient of the anti wave, of the same absolute magnitude but of opposite polarity with respect to ambient pressure will assume a perpendicular wavefront 84 which is identical to wavefront 82. These wavefronts coincide at position $Z_3$ by proper choice of transmission times. If higher order acoustic modes were allowed to exist, it would be impossible to match the anti wave with the propagating acoustic wave by use of the simple apparatus of FIG. 1. Since generation of noise from practical sources generally occurs in a random pattern, the wavefront 30 would generally impinge the opening of duct 80 at different angles, and this would undesirably excite reflecting waves of higher acoustic modes than the (0,0) mode.

It is known that for each acoustic mode of form $(m,n)$ where m represents a cosine variation along the X axis and n represents a cosine variation along the Y axis, sound propagation in a duct can occur only if the frequency is less than the duct mode cut-off frequency $f_{mn}$. For frequencies lower than $f_{mn}$, propagation occurs with a minor attenuation factor dependent on the acoustic characteristics of the wall. For frequencies higher than $f_{mn}$, the amplitudes of higher order modes decay exponentially with distance along the Z axis, and such modes quickly decay to negligible values. For a rectangular duct of cross-section $a,b$, and in the absence of mean flow, it is known that the mode cut-off frequency $f_{mn}$ is defined by:

$$f_{mn} = \frac{c}{2\pi} \left[ \left(\frac{m\pi}{a}\right)^2 + \left(\frac{n\pi}{b}\right)^2 \right]^{1/2} \quad (1)$$

where $c$ represents the velocity of sound in the medium for a given temperature T. For a temperature $T_c$ in degrees centigrade, the velocity of sound c in meters per second is given by:

$$c = 20 \ (273.2 + T_c)^{1/2} \quad (2)$$

whereas for temperature $T_f$ in degrees Fahrenheit, the velocity of sound c in feet per second is given by:

$$c = 49 \ (459.7 + T_F)^{1/2} \quad (3)$$

Of course, the wavelength $\lambda$ is related to frequency $f$ by:

$$\lambda = (C/f) \quad (4)$$

In accordance with the present invention, coherent propagation is accomplished by causing both the acoustic wave and the mirror symmetry anti wave, which are in-phase due to selection of transmission times as previously explained, to propagate with identical acoustic mode. Generally, this is most easily accomplished by prohibiting propagation of all modes higher than (0,0). Since the lowest frequency higher order modes are the (1,0) mode and the (0,1) mode, solely plane wave propagation occurs by setting ($m=1, n=0$) or ($m=0, n=1$), and by selecting the cut-off frequency $f_c$ of low pass filter 37 to be equal to the mode cut-off frequency $f_{10}$ or $f_{01}$. Applying these conditions to equation (1) results in:

$$f_c = f_{10} = (c/2a) \quad (5)$$

$$f_c = f_{01} = (c/2b) \quad (6)$$

When all frequencies below a selected frequency $f_s$ are to be cancelled, the maximum dimensions of the duct are easily solved by use of equations (5) or (6), depending on whether $a>b$ or $a<b$, respectively, and by making $f_c=f_s$. For example, by use of equations (5), (6), (2) and assuming $a=b$, the duct 80 should have the following dimensions, in meters, to cancel all acoustic frequencies below $f_2$:

$$a = b = (c/2f_s) = (10/f_s)(273.2 + T_c)^{1/2} \quad (7)$$

It should be noted that the dimensions of the duct can be substantially increased at elevated temperatures. This leads to the important result that the dimensions of the duct can be substantially increased in gas turbine engines and like applications.

The dimensions $a,b$ of the duct can be increased above the values given by equation (7) if propagation of the (1,0) and (0,1) modes is not possible due to the manner of excitation of the duct modes and/or suppression of the modes by structure in the duct. A given source can excite only certain modes in a duct. For example, if a source excites a velocity distribution which is uniform for a given value of Z, only the plane wave (0,0) mode can be excited irrespective of the dimensions $a,b$ of the duct. For a given application, if the external noise which impinges the duct does not change angle and has certain characteristics, and if the acoustic transmitter 44 is located so as to produce similar characteristics, then propagation at the (1,0)

and (0,1) modes may not be possible and hence the dimensions $a,b$ given by equation (7) may be increased in accordance with equation (1) until reaching a size at which excitation of a given higher order mode $f_{mn}$ is possible.

The flow of the medium through duct 80 may be in either direction along the Z axis. Thus, the flow may coincide with the direction of longitudinal advance of the acoustic wave, from the left to the right in FIG. 1, or the flow may be opposed to the longitudinal advance of the wave, from the right to the left in FIG. 1. In this latter instance, the apparent velocity of propagation of the acoustic wave is proportionately less as compared with propagation in the absence of mean flow.

Duct 80 may have any arbitrary shape which best fits the cross-sectional area to be occupied. Generally, plane wave propagation in the duct is desirable, as explained above, regardless of the type of coordinate system which would apply. Where the area is greater than the permissible dimensions of the duct, two or more ducts may be stacked so as to occupy the entire area. Where the mean flow of the medium is substantial, as in a gas turbine engine, the dimensions of the duct may have to be altered since mean flow influences the frequency of the cut-off modes. It is known that downstream modes have the same cut-off frequency as those that exist in the absence of mean flow. Ustream mode cut-off frequencies, however, are less than those in the absence of mean flow by the factor:

$$(1 - M^2)^{1/2} \qquad (8)$$

where M is the Mach number of mean flow of the medium, namely, velocity of mean flow divided by the local speed of sound ($c$). For applications in which the mean flow varies, is turbulent, and/or the cross-section of the duct is other than rectangular or circular, determination of the duct dimensions is best determined by empirical methods.

The length of the duct $D_d$ must be sufficient so that modes above the cut-off frequency are exponentially attenuated to an insignificant energy level. This condition must be met for both the external acoustic wave, which travels distance $D_d$ in the duct, and for the locally generated anti wave which travels distance $D_2$. The length $D_d$ of the duct may be extended, if desired, so that acoustic receiver 33 is located within the duct. When the acoustic receiver 33 is located outside the duct, as exemplary illustrated, a certain ratio of the impinging acoustic energy will be reflected at the mouth of the duct. Thus, the system gain must be different than when the receiver 33 is located within the duct and hence any reflection at the mouth of the duct will have already occurred. The gain of amplifier 35 thus depends on numerous factors including the ratio of energy reflected at the mouth of the duct when the acoustic receiver is outside the duct, the present of abrupt changes in cross sectional area within the duct which cause a portion of the propagating acoustic wave to be reflected backward, etc.

Physically, the above factors result in a duct in which the longest cross-sectional dimension is generally less than one wavelength of the highest frequency acoustic wave ($f_s$) to be cancelled. Frequencies higher than $f_s$ are allowed to pass through the duct without attenuation. These dimensions prevent reflecting or bouncing waves below frequency $f_s$ from propagating at an angle with respect to the longitudinal axis of the duct. The maximum cross-sectional dimension can be relatively large for many applications since the most troublesome sound waves often have the lowest frequency, and because the atmosphere better attenuates high frequencies. The length of the duct is preferably substantially longer than the cross section to sufficiently attenuate all modes above the cut-off mode. When the duct has these dimensions, an external sound wave propagating at any vector within a solid hemisphere is redirected and forms a plane wave propagating through the duct.

Returning to a consideration of the anti noise source 34, the frequency response curve of the audio amplifier 35 is selected by conventional emphasis and deemphasis techniques so that the frequency response of the overall system from receiver 33 through and including transmitter 44 is flat up to $f_c$. Delay line 39 may be variable in order to automatically adjust the transmission time of the anti noise system when a change occurs in the transmission time of the medium. The exact construction of a variable delay line forms no part of the present invention, and will not be described in detail. A variable delay control 90 has a control output, either mechanical or electrical, which adjusts the time delay produced by delay line 39. Changes in time delay could also be produced by controlling the time constant of networks in audio amplifier 35. The variable time delay could also be provided by mechanically moving one or both of the acoustic transducers so as to vary the physical distance $D_1$. Thus, the variable delay 90 could be connected to control a motor driven mechanism for moving transmitter 44 so as to increase or decrease the distance $D_1$.

As the temperature T of the medium varies, the velocity of sound c varies in the manner given by equations (2) and (3). To compensate for this change, a temperature sensor 92 is located in thermal contact with the medium in the duct. The sensor 92 may be of any suitable type which has an output representing the temperature T of the medium. A function generator 94 is responsive to the sensor to produce the function:

$$1/K_1 \sqrt{K_2 + T} \qquad (9)$$

where $K_1$ equals a constant, $K_2$ equals a constant, and T equals the temperature being sensed. $K_1$ and $K_2$ are chosen so that the output of function generator 94 varies in inverse proportion to the velocity of sound c in the medium. As the velocity of sound increases, for example, due to an increase in temperature T, the time of propagation through the medium from point $Z_1$ to $Z_2$ is decreased. The function generator 94 is effective to shorten the time delay produced by delay line 39, effectively decreasing the distance $D_1$. Thus, the system automatically compensates for changes in a condition which effects the local speed of sound.

Other methods of adjusting for a change in temperature can also be provided. For example, the acoustic transmitter 44 may be located at the minimum distance necessary to overcome the delay time in the conversion processes, as previously explained. The output of the transmitter may then be coupled through an acoustic tube or path to a position at which cancellation is to be effected. The acoustic tube or path may be vented to the same medium as in the duct 80, so that a change in temperature also effects the transmission time from transmitter 44 to the interference position $Z_3$. Suitable choice of the length of the acoustic tube can partially compensate for temperature deviations. It also can provide an acoustic time delay sufficient to allow elimination of delay line 39, and hence also the associated temperature sensor 92, function generator 94, and variable delay control 90.

All acoustic feedback paths from transmitter 44 to receiver 33 must be compensated for or eliminated. If transmitter 44 generates a backward travelling pressure wave (that, travelling in the $-Z$ direction), then mounting structure 96 must be positioned so as to block the backward pressure wave. Desirably, the acoustic receiver 33 is in the form of a unidirectional microphone having its sensitive axis in the negative Z direction. Thus, any backward pressure wave from the transmitter 44 would not result in a microphone output signal. Similarly, a unidirectional microphone is desirable if an external acoustic wave might enter duct 80 at the opening illustrated to the right in FIG. 1. Such an external wave would propagate to the left and, upon reaching microphone 33 would produce an output signal which in turn would result in generation of a false anti wave. A unidirectional microphone response characteristic is also desirable if the duct 80 includes any abrupt changes in cross-sectional area prior to position $Z_3$. Such abrupt changes will produce a backward scattering of a portion of a propagating acoustic energy. Of course, it is not necessary to compensate for backward reflections beyond position $Z_3$, such as at the duct opening located from $Z_3$ to $Z\infty$, since the anti wave will be superimposed on the acoustic wave and hence will not produce any detectable pressure variations.

Acoustic receiver 33 may be simplified if duct 80 does not produce any reflected backward energy (or if such reflection is electrically compensated for as explained with reference to FIG. 13), and if the possibility of sound entering the duct through the right hand opening is negligible. In such a situation, the receiver may take the form of a zero order gradient or pressure microphone mounted in the wall of the duct.

The sound abatement method and apparatus described above can be used in a wide variety of applications where sound energy is to be attenuated while the free flow of the medium is to be continued. In the following sections, a number of examples are given of specific solutions to particular noise abatement problems. It should be understood that these examples are merely illustrative of the many and wide variety of applications to which the noise cancellation method and apparatus is applicable.

GAS TURBINE ENGINE

Turning to FIG. 3, an exemplary aircraft gas turbine engine includes a subsonic inlet or diffuser 100 defining a forwardly facing air intake opening which provides a high pressure rise to a low pressure compressor or fan 103. The hub or center body 105 of the engine compressor is located at the longitudinal center axis of the engine. Air enters fan 103 and is compressed to form a cold jet which is discharged from fan outlet duct 107. A portion is also discharged through a duct 109 to a multi-stage, high pressure axial compressor 112 before being discharged into a combustion section or burner 114 where it is heated. The heated air then passes through a high pressure turbine 116 and a low pressure turbine 118 and has enough energy extracted therefrom to cause the turbines 116 and 118 to drive compressors 112 and 103, respectively. The heated air is then discharged as a hot jet through the exhaust outlet or nozzle 120 in order to produce thrust.

Fan 103 is formed by one or more stages, and herein includes a first blade row 122 and a second blade row 123. One or more stator vanes (not illustrated) may be utilized as desired. The air flow entering the fan must be of low Mach number on the order of 0.4 or less. Thus, the entrance duct 100 acts as a diffuser which at high flight Mach numbers provides a high pressure rise. Since the Mach number within the duct 100 is always less than 1.0, compressor sound is radiated forwardly out of the inlet 100, as is well known. Additional noise produced by the compressor and turbine blades and vanes is also radiated out the fan outlet 107 and the exhaust outlet 120. Axial flow compressors produce a spinning or helical noise pressure field of one or more lobes which spin about the longitudinal shaft axis. The pressure field is transmitted through the annular ducts and is radiated external to the engine.

In accordance with the present invention, each engine duct which opens to the atmosphere includes an anti noise system (not illustrated to scale in FIG. 3) constructed in accordance with the principles of FIG. 1. In each engine duct, a plurality of aerodynamically contoured vanes 130 divide the annular opening into a plurality of generally pie-shaped ducts each of which convert the spinning noise pressure patterns into plane waves of (0,0) mode. When the radial extent the vanes 130 is sufficiently long to allow the duct to pass the next higher order acoustic mode, a transverse shroud 132 is added to create two stacked ducts, as illustrated for inlet 100 and a suppressor outlet to be explained.

The acoustic transmitter 44 of FIG. 1 takes the form of a modulated gas flow speaker 136 which generates an anti wave coupled through an acoustic tube 138 in a vane 140 to a centrally located horn shaped opening 142. To power the modulated gas flow speakers 136, one or more bleed ports form sources of gas at a pressure offset from ambient pressure at the horn openings 142. Two different types of modulated gas flow speakers are disclosed. An "ambient" modulated speaker, as shown in FIG. 6, requires a first pressure supply greater than ambient pressure and a second pressure supply less than ambient. An "offset" modulated speaker, as shown in FIGS. 7 and 8, requires only one pressure supply, either greater or less than ambient pressure. For illustration, the ambient speaker is shown associated with inlet 100 and the offset speaker is shown associated with fan outlet 107 and the suppressor outlet, but it should be understood that all speakers may be of the same type, or can be mixed in any manner.

The ambient modulated gas flow speaker uses a first pressure source greater than ambient pressure, provided by a bleed port 150 located between the first blade row 122 and the second blade row 123 of the fan. Tubing 152 couples the bleed port 150 to the ambient speakers 136 associated with inlet 100. The second pressure source, below ambient pressure, is provided by a second bleed port 156 which opens to the inlet diffuser. Port 156 is coupled through supply tubing 158 to the same ambient speakers.

Only one pressure supply is necessary for the offset modulated gas flow speaker associated with fan outlet 107. This pressure supply may be formed by the bleed port 150, but it should be understood that a separate bleed port, or a port forming a negative ambient supply, could equally be used. To power the offset speakers 136 associated with the exhaust suppressor, a bleed port 164 opens to one stage of the high pressure compressor 112. The bleed port 164 is coupled through pressure supply tubing 166 to the speakers 136. Thus it will be noted that the supply pump 46 of FIG. 1 already exists in heat engines having a pressure gradient, and it is only necessary to tap the engine at appropriate locations in order to supply the modulated gas flow speakers with an appropriate gas flow. The actual location of the bleed ports is selected to supply the pressure requirements of the speaker, and can be at any location within the engine.

The general operation of the system is as follows. Acoustic receivers (not illustrated in FIG. 3) are located in or associated with the edges of vanes 140 which face the rotating machinery. As sound energy reaches the receiver, the anti noise source 34 of FIG. 1 modulates the gas flow from speakers 136 to produce at the horn openings 142 an anti wave which is in-phase and of mirror symmetry with respect to the sound energy. The anti noise ducts defined by vanes 130, shrouds 132 when used, and the outer and inner casings of the engine convert the spinning noise pressure patterns into plane waves of (0,0) mode. The anti noise ducts also confine the anti wave to the plane wave (0,0) mode so that superposition of corresponding wavefronts will occur.

FIGS. 4 and 5 illustrate two typical anti noise ducts and associated modulated gas flow speakers 136 located in an annular opening of the turbofan engine of FIG. 3. As seen in FIG. 4, the speakers 136 are mounted external to the engine casing wall 170, but would be located within the housing for the entire jet engine. A lower wall 172 defines with casing 170 and each pair of adjacent vanes 130 a pie shaped anti noise duct. Lower wall 172 may correspond to shroud 132 associated with the inlet 100 and exhaust nozzle or may correspond to the inner housing wall of the fan outlet 107. As seen in FIG. 5, the Z axis of each anti noise duct corresponds to the longitudinal axis of the engine. When the anti noise duct is located in an air inlet, air flow coincides with the arrow 180 and is opposed to the arrow 182 which represents the direction of noise propagation. The vanes 130 may be curved, if desired, and can form the first stage stator vane or inlet guide vane for the fan/axial compressor. When the anti noise ducts are associated with the fan outlet and the exhaust outlet, then air flow coincides with the arrow 182, as does the propagation of the sound wave to be cancelled.

To cancel pure jet noise, a cylindrical suppressor casing 183 extends rearward from the circular exhaust nozzle 120 which has a nozzle diameter d. The hot jet exhaust of high velocity is mixed within casing 183 with ambient or secondary air entering through an annular vent 184. Various conventional mixing structures (not illustrated), such as a fluted exhaust nozzle, can be used to aid in the mixing process. At a selected distance downstream corresponding to an integer number N of nozzle diameters d at which flow is subsonic and the majority of turbulence created jet noise has been generated, a suppressor exhaust 185 is located.

Within vent 184 and exhaust 185, anti noise ducts as previously described are located. While suppressor casing 183 extends for a substantial distance aft of the engine, it should be noted that very little structure is located within the suppressor, and hence its weight is not significant. While vent 184 is illustrated as incorporating an anti noise duct, this is purely to illustrate the manner in which secondary air can be supplied without allowing propagation of the jet noise through the supply source.

For the illustrated engine, the fan outlet 107 would in practice be replaced by a bypass duct extending back and mating with vent 184, allowing the low velocity cold flow to form the mixing air and allowing elimination of the anti noise apparatuses associated with fan outlet 107 and secondary vent 184. Another variation would be to utilize an aft-fan engine in which the fan outlet directly connected with suppressor casing 183. In such an engine, the aft mounted fan inlet would include anti noise ducts, similar to the ducts associated with fan inlet 100 and/or vent inlet 184. The forward compressor would also incorporate anti noise ducts within its inlet.

Various conventional noise abatement techniques (not illustrated for clarity) can be incorporated in addition to the applicant's method. For example, the vanes 130 can be covered with an acoustic lining, especially for the purpose of suppressing high frequency noise above the anti noise duct cut-off frequency, which corresponds to the cut-off frequency of the low pass filter 37 of FIG. 1. For a particular engine, it may be desirable to use noise cancellation for only certain openings, and to use other known noise abatement techniques for the remaining openings. The operation of the two types of modulated gas flow speakers, as well as the location of various of the anti noise components will now be explained.

MODULATED GAS FLOW SPEAKERS AND MOUNTINGS

Modulated gas flow speakers are useful whenever the sound noise intensity to be cancelled is of high energy level. It is recognized that modulated gas flow speakers (also known as air modulated sirens, electropneumatic speakers and throttled air flow speakers) have efficiencies greater than 100% when measured by the usual loudspeaker standard (ratio of acoustic output power to electric input power), although of course the efficiency is less than 100% when total energy considerations are taken into account. The anti noise ducts may use known modulated gas flow speakers as the acoustic transmitter, or the forms shown in FIGS. 6-8, especially for attenuation of aerodynamic noise. For example, conventional modulated gas flow speakers used to simulate broadband jet noise in acoustic fatigue testing have a sound pressure level on the order of 150 to 165 dB for an air supply pressure of 30 to 40 lb/in$^2$ and a flow rate of 200 to 800 ft$^3$/min, where reference pressure is 0.0002 microbar (0.0002 dyne/cm$^2$). A typical jet spectrum, for example, might have a sound pressure level of 165 dB overall, and a peak level of 140 dB at 300 Hz.

The applicant's invention goes beyond the use of the illustrated modulated gas flow speakers solely in conjunction with an anti noise system. The speakers of FIGS. 6 and 7-8 have substantial utility by themselves. Also, the invention encompasses the combination of modulated gas flow speakers powered from bleed ports in heat engines for generating an acoustic wave which follows a desired electric input signal. For example, the speakers can form powerful loudspeakers used on low flying aircraft and helicopters to transmit a message to personnel on the ground. Also, the speakers have utility in experiments to quiet jet exhaust noise by acoustic seeding. Other uses will be apparent and fall within the scope of this invention.

When used in gas turbine engines and other applications in which obstruction to an air flow is to be minimized, the modulated gas flow speakers 136 may be mounted external to the anti noise duct, as illustrated in FIG. 6. However, in other applications in which the external dimensions are to be minimized, it may be desirable to mount the modulated gas flow speakers 136 within the anti noise duct, as illustrated in FIG. 7. The "ambient" modulated gas flow speaker 136 of FIGS. 6 and the "offset" modulated gas flow speaker 136 of FIG. 7, could be switched, or used with different mounting structure than illustrated, as desired.

Turning to FIG. 6, the ambient modulated gas flow speaker 136 is contained within a tubular housing 190 which has a first annular chamber 192 for supplying gas above ambient pressure (as defined by the pressure of gas in tube 138), and a second annular chamber 194 for supplying gas below ambient pressure. Chamber 192 has an intake port 196 coupled through a valve 197 to tubing 152 which supplies gas at +P with respect to ambient. Similarly, chamber 194 has an intake port 199 coupled through a valve 200 to tubing 158 which supplies gas at a negative pressure −P.

A hollow tubular diaphragm 202 is located in a hollow cylindrical core defined by the walls of chambers 192 and 194. At a driven end of diaphragm 202, a voice coil 204 is located in a magnetic flux field produced by a magnetic core 206 of E- shaped cross-section. Core 206 produces a steady DC flux field from a permanent magnet, or from a DC winding. Voice coil 204 is coupled to delay line 39 of FIG. 1, or to low pass filter 37 if the delay line is eliminated. The diaphragm 202 includes a plurality of elongated slots 210 which are circumferentially spaced about the diaphragm.

Positive pressure chamber 192 includes a plurality of elongated slots 212 which match diaphragm slots 210 and are circumferentially located in alignment therewith. In the absence of a signal on voice coil 204, the lowermost end of slot 212 slightly overlaps the upermost end of slot 210, allowing gas from chamber 192 to pass into the center chamber of the diaphragm 202. Simmilarly, the negative pressure chamber 194 includes a plurality of elongated slots 214 which match diaphragm slots 210 and are circumferentially aligned therewith. In the absence of a signal on voice coil 204, the upermost end of slot 214 slightly overlaps the lowermost end of slot 210, allowing gas within the center chamber of the diaphragm 202 to pass into the chamber 194. Thus in the absence of an input signal to voice coil 204, a very small stream of gas in effect flows from chamber 192 to chamber 194. However, it should be understood that the slots 210 can be made nonoverlapping with the slots 212 and 214, if desired.

As voice coil 204 receives an input signal, the diaphragm 202 is reciprocally driven along its axial direction. For a positive going signal, for example, the diaphragm 202 is driven upward so that a greater length of the diaphragm slots 210 overlap the positive pressure slots 212, thereby allowing a proportionately greater gas flow into the center annular chamber. Any upward movement of the diaphragm 202 blocks the negative pressure slots 214. Conversely, as the electrical signal goes negative, the diaphragm 202 is driven downwardly and diaphragm slots 210 overlap the negative pressure slots 214 so that gas flows from the center chamber into chamber 194. The electrical signal thus modulates a gas flow, both above and below ambient pressure, with the pressure deviation being proportional to the absolute value of the electrical signal deviation. Since center chamber connects with a throat chamber 220 which in turn connects with horn tube 138, acoustic waves are propagated to the horn opening 142.

Ambient modulated gas flow speaker 136 of FIG. 6 is different than conventional modulated gas flow speakers, in that it does more than simply modulate a gas stream offset from ambient pressure. Rather applicant's modulator produces proportional modulation of a gas stream above ambient and a gas stream below ambient pressure, which streams are combined to produce the actual desired acoustic variation. This results in a more efficient conversion process than has been possible with prior modulated gas flow speakers.

Various modifications can be made to the illustrated structure. While the diaphragm 204 has been illustrated as located within a central core defined by the pair of chambers 192 and 194, the diaphragm can be located within the chambers (in the manner generally shown in FIG. 7). Furthermore, while only two chambers have been illustrated in the interest of clarity, additional pairs of positive and negative pressure supply chambers may be located along the axial extent of the speaker, each having an associated diaphragm slot 210.

For proper operation, pressure chambers 192 and 194 must be supplied with gases which are equally offset from ambient pressure. In a gas turbine engine, embient pressure at any point $Z_2$ can fluctuate over a wide range due to operation of the engine. An increase in turbine speed, for example, increases the ambient pressure at $Z_2$ but also increases the supply pressures at the bleed ports 150 and 156. While this operation tends to compensate for changes in pressure, the relationship between the pressures at the bleed ports and a speaker opening located between is not perfectly linear.

Any tendency to shift the center pressure of the speaker away from ambient pressure at horn opening 142 is compensated for by a servo valve 230. A pair of bleed lines 232 and 234 are connected to the positive and negative pressure supply lines 152 and 158, respectively. The bleed lines are coupled together at a junction 236 which has a configuration to simulate the pressure condition existing at a center position within the diaphragm 202 as a result of air flow between chambers 192 and 194 in the absence of an input signal to coil 204. To monitor ambient pressure at the horn opening, a total pressure port 238 in vane 140 opens in the same direction as the horn opening 142. The port 138 is coupled through a pressure tube 240 to servo valve 230.

The two pressure signals available at junction 236 and tube 240 are fed into opposite sides of a bellows actuated control rod 242 of the servo valve 230. The position of the control rod 242 controls in a known manner a pair of valve elements 244 and 246. When junction 236 has a pressure greater than ambient pressure (as illustrated), the output of valve element 244 controls valve 197 in a manner to increase the pressure drop, while valve element 246 operates to decrease the pressure drop across valve 200. This causes the pressures within chambers 192 and 194 to have equal and opposite offsets from the actual ambient pressure as sensed at port 238.

Unidirectional microphone 33 may be located internally within vane 140, or may be located externally as illustrated in FIG. 6. The microphone is coupled through an acoustic tube 250 to a port 252 opening opposite to the horn port 142. By way of illustration, a dynamic microphone is illustrated which has a movable diaphragm 254 with an attached voice coil 256. The voice coils are suspended within the annular opening of a magnetic flux generating core 258. The output of voice coil 256 is coupled to the amplifier 35 of FIG. 1, which amplifier may also be located external to the vane 140.

To cause the dynamic microphone to have a unidirectional characteristic, side openings 260 are coupled to an acoustic tube 262 which has a port 264 opening to one side of the vane 140. The side openings 260 permit acoustic pressures to reach the air cavity behind the diaphragm via the annular space between the moving coil and the pole piece and the air cavity form a main phase shifting network, with the slot providing acoustical resistance and the cavity providing compliance. The resistance of the slot is obtained due to the viscous loss introduced when air particles move in a restricted space. The result is an electrodynamic mass-controlled phase shift microphone which discriminates against an acoustic wave travelling from the left to the right in FIG. 6, while being sensitive to an acoustic wave travelling from the right to the left. It should be understood that many unidirectional microphones may be used in place of the exemplary illustrated phase-shift microphone of the moving coil type. For example, piezoelectric elements forming a pressure gradient unit and a pressure unit can be interconnected in a conventional manner to provide directional discrimination. Many other well known types of unidirectional microphones can also be utilized.

For use in a gas turbine engine, the ambient modulated gas flow speaker of FIG. 6 may be replaced by the offset modulated gas flow speaker of FIG. 7. That is, the mounting external to vane 140 would still be utilized. Turning to FIG. 7 for a description of the offset speaker 136, a tubular housing 300 has a single annular pressure chamber 302. A port 304 connects chamber 302 with a supply line 306 of gas at a pressure either above or below ambient pressure in the outlet tube of the speaker. Thus, supply line 306 may be connected to any of the bleed ports 150, 156 or 164 of FIG. 3, when the speaker is used in the gas turbine engine.

Annular chamber 302 includes an inner wall having a series of elongated slots 306 formed therein to allow gas to pass to a hollow cylindrical core 308 which leads through a tube to a horn opening (not illustrated), which may be similar to the previously described embodiment. A cylindrical diaphragm 310, see FIG. 8, is coaxially mounted adjacent the cylindrical inner wall of the pressure chamber 302. Diaphragm 310 extends upwardly and carries at its upper extent a voice coil 312. The voice coil is located in an annular magnetic flux field formed by a magnetic core 314 of E-shaped cross-section. Core 314 may be of any known construction which provides a steady magnetic flux field through the annular opening, so that electrical energization of the voice coil produces axial movement of the diaphragm 310. The diaphragm includes a series of elongated slots 315, of the same shape as the slots 306, but axially offset therefrom when the voice coil is not energized. Thus, the slots 315 normally face the inner wall of the pressure chamber. Upon energization of the voice coil, the slots 315 are driven to a position which overlaps the fixed slots 306, allowing gas to be transferred. It will be appreciated that the amount of overlap is dependent on the axial position of the diaphragm, which in turn is dependent on the magnitude of the electrical signal to voice coil 312.

The diaphragm 310 is located on the "high" pressure side of the valve modulator (assuming the pressure supply is positive with respect to ambient), producing a more efficient operation, as is well known. However, it should be noted that the supply line 306 can be connected to a negative pressure source. Desirably, the slots 315 of the diaphragm do not overlap the fixed slots 306 of the chamber wall when no electrical signal is impressed on voice coil 312, as this reduces the gas supply requirements for the speaker. While two different types of modulated gas flow speakers have been illustrated, it will be appreciated that other known types of modulated gas flow speakers can also be utilized in practicing the invention.

Where flow restrictions in the anti noise duct are not critical, the modulated gas flow speaker and associated components may be mounted within a vane 320, FIG. 7, which is located within the duct. Vane 320 may have a passageway 322 for circulation of a cooling fluid. The speaker is located in a center core 324, which may be of elliptical configuration to generally conform to the aerodynamic shape of the vane 320. The modulated gas flow speaker 136 similarly can be of elliptical cross-section, since all movement of the diaphragm is an axial rather than rotational or circumferential. The anti noise source 34 may be contained within core 324. A hollow chamber 330 within core 324 is provided for any suitable unidirectional microphone 33. A port 332 may connect with a tube leading to a side opening of the vane 320, similar to port 260 and tube 262 of the unidirectional microphone 33 of FIG. 6. An acoustic tube 334 couples the active surface of microphone 33 with an opening 336 facing the direction of the propagating noise wave. While microphone 33 has been illustrated as located internally within the vane 320, it will be appreciated that the active surface of a piezoelectric microphone or other type of solid state acoustic transducer may form a portion of the external wall of vane 320.

ADDITIONAL ANTI NOISE EMBODIMENTS

In FIGS. 9–15, additional embodiments of the anti noise system are illustrated. The acoustic transmitter in these embodiments is in the form of a dynamic loudspeaker, as is desirable when a supply of air under pressure is not readily available, and the sound pressure level of the noise wave to be cancelled is within the acoustic output range of a dynamic loudspeaker. However, it should be appreciated that modulated gas flow speakers could be substituted for the illustrated dynamic loudspeakers, if desired for particular applications.

When the noise source is at a considerable distance from the anti noise apparatus, the propagating acoustic wave will have substantially equal pressure variations for a considerable extent along the wavefront. In such a case, one microphone 33 and one loudspeaker 44 may serve a plurality of acoustic ducts, each having a maximum cross-sectional area to produce a cut-off frequency (for the lowest order acoustic mode above (0,0) which could propagate) just above the highest frequency noise wave to be cancelled. In FIGS. 9–12, such an embodiment is illustrated in which each anti source unit 350 has a square outer cross-section and includes a single microphone 33 and a single loudspeaker 44 for serving four surrounding ducts. The plurality of individual units 350 may be stacked vertically and horizontally to fill any desired space in which a propagating sound wave is to be cancelled.

Each anti source 350 includes a center tubular section 352 which contains the anti noise source 34 of FIG. 1. The center section 352 is of circular cross-section, and extends equally into four ducts 355, 356, 357 and 358 each of square cross-section except for the presence of the center tubular section 352. Each acoustic tube or duct 355–358 is of identical construction, but is oriented along a different outer quadrant of the unit 350. Each duct forms an open passageway which allows free flow of the elastic medium, such as air, through the duct in either longitudinal direction.

As seen in FIG. 10, the center section 352 extends outward at the receiving end to form a tapered cone 362 which projects beyond the plane of the duct openings. A microphone diaphragm 364 is suspended within a center chamber formed in center section 352. The chamber is vented through four forward slanting tubes 366 opening into each of the four ducts. If the mean flow of the medium through the ducts is not steady, additional tubes (not illustrated) may extend rearwardly from the face of diaphragm 364 to provide a Bernoulli windshield which reduces the effective wind pressure on the diaphragm. The diaphragm 364 carries a voice coil which moves through a steady magnetic flux field.

Side apertures 370 permit the propagating acoustic pressures to reach the air cavity behind the diaphragm, thus forming a phase shifting network which causes the response of the microphone to be unidirectional. An additional plurality of side apertures (not illustrated) may open into the ducts so as to extend the frequency range of the unidirectional characteristic by forming a multi-path microphone of plural ports. The output of the voice coil is coupled to the amplifier 35 of FIG. 1, which may be located in a housing 372 within the center core 352. The temperature sensor 92 FIG. 1, if utilized, may be imbedded in the center core and located so that one surface thereof is contiguous or in thermal contact with the medium in the ducts.

Acoustic transmitter 44 is of the dynamic type having a voice coil attached to an inverted or convex cone diaphragm 375. The voice coil is located within an annular flux field produced by any conventional magnetic core structure. The center circular aperture within which cone diaphragm 375 is located is defined by a wall which expands outwardly along a horn shaped surface 377 and terminates at a circular peaked rim 379. A cone diffuser 382 is positioned axially opposite the apex of the cone diaphragm 375. The slat surface 383 of the cone diffuser forms with the horn wall 377, a multi-celled expanding horn which opens into each of the ducts 355–358.

The four ducts are separated by four interior walls 384 which each extend into the expanding horn and terminate at an edge 386 near the apex of the cone diffuser. Thus, the edges 386 serve to divide the horn into four similar sections, each of which feeds a different duct. Since each duct is excited at a corner hereof, higher order acoustic modes could easily be established, so the cross-sectional dimensions of the duct are desirably selected to be less than the dimensions $a$, $b$ given by equation (7). Also, the dimension ($D_2$) between position $Z_2$ and $Z_3$ is made sufficiently long so as to dissipate all higher order acoustic modes before any substantial change in cross-sectional area occurs.

The interior walls 384 and the outer walls of unit 350 are constructed with sufficient rigidity to inhibit the formation of bending waves which would undesirably transmit acoustic energy through the unit 350 with a different velocity of propagation than exists for the hollow passageways. When adjacent units 350 are placed together, the thickness of adjacent pairs of outer walls is doubled, and thus aids in minimizing transmission by bending waves. To further minimize the introduction of bending waves the forward edge 395 of all walls may be knife-like, and other forward facing surfaces such as center core 352 are desirably tapered to a point.

Various modifications may be made to unit 350 to better match conditions caused by the mean flow of the medium and/or to alter the directivity pattern for any particular loudspeaker and associated mounting structure. For example, an acoustic absorption material may be deposited in a layer over the inner walls of the unit 350. As is well known, a duct or tube when lined with an acoustic absorption material alters the wavefront shape of a wave propagating therethrough by producing a time delay in the wave immediately adjacent the acoustic lining. The surface of the wavefront, adjacent the duct walls, curves backward with respect to the direction of propagation and forms a slightly inverted dish pattern. In addition, such acoustic lining aids in absorbing frequencies above the duct cut-off frequency.

Another example of a modification is to use a transition surface for altering the cross-sectional shape of the duct to better match the near field directivity pattern of a loudspeaker. The opening adjacent $Z_3$ may be of circular shape to match the circular diaphragm 375. A smooth surface 392 extends or fills in the space from a perpendicular outer wall to a circular rear wall 390. A portion of the transition surface 392 for duct 358 is illustrated in perspective in FIG. 9 for an upper stacked unit 350. The surface 392 may be integrally molded as a part of the duct itself, or may comprise a fill-in material added to the duct.

In FIGS. 13–15, another embodiment forms an anti noise source 400 useful when the external acoustic wave has a surface wavefront which is at a substantial angle or skew with respect to the frontal duct opening 404 of the individual source 400. By stacking a plurality of units 400, an impinging wavefront having a large angle (such as produced by a plane wave propagating at a substantial angle or by a spherical wave) will produce in the plurality of ducts a series of plane waves which are offset in time, corresponding to the time in which the external wavefront reaches the opening 404 of each particular duct. It is generally impossible to match a series of offset plane acoustic waves with an anti wave from a single loudspeaker, such as produced by the apparatus of FIGS. 9–12. The apparatus 400 overcomes this problem by providing a complete sound cancellation system within each acoustic duct.

Each anti source 400 comprises a tube 410, of generally square cross-section, having a central hollow passageway. The cross-section of tube 410 is illustrated in FIG. 13 along a diagonal to better illustrate the loudspeaker driving units 412 which are located in the corners of the tube. The drive units, diagramatically illustrated, consist of a magnetic flux generator for producing a steady magnetic field across an air gap in which an annular voice coil 414 is located at an angle with respect to the longitudinal axis of the tube 410. Attached to the voice coil 414 is an annular convex diaphragm 416, with an open center, which encircles the inner periphery of the tube 410.

The annular convex diaphragm 416 (not to scale) has ribbed ends 418 and 419 which suspend diaphragm 416 for movement along the axis of the voice coil 414, which axis has an angle of 45° or less with respect to longitudinal axis of the tube 410. The shape of diaphragm 416 and the suspension system are chosen so as to produce anti waves which diffuse throughout the open active interference space $Z_3$ adjacent an opening 420 of the tube 410. Although the generated anti waves will have some transverse component in the vicinity of $Z_2$, the axis of drive and the shape of the diaphragm are chosen to produce pressure components substantially parallel to the longitudinal axis.

The external acoustic wave propagating through the tube is converted to the (0,0) mode, and hence the vibratory motion of the elastic medium (as air) is longitudinal and coincident with the longitudinal axis of the tube 410. In order to superimpose incremental wavefronts, the particle motion of the anti wave must be purely longitudinal to coincide with the longitudinal particle motion of the external acoustic wave. To the extent that diaphragm 416 produces particle motion other than longitudinal, the distance from $Z_2$ to $Z_3$ must be sufficiently long to insure that higher acoustic modes have exponentially decayed to a negligible value.

Each of the drive units 412 are located in a chamber or cavity 422 formed within each corner of the tube 410, see FIG. 14. This allows the bulky magnetic drive generator to occupy as little interior space as possible, thus allowing enlargement of the diameter of the hollow center passageway. Microphone 33, which may be of any known construction including pizeoelectric or magnetostrictive, is located in one corner of the tube 410, as seen in FIGS. 13 and 15. The active transducer side of microphone 33 is open to an elongated hollow tube 427 which connects with an opening 430 contiguous with the interior passageway. As an acoustic wave passes opening 430, a pressure variation propagates through the tube 427 to the microphone 33. The microphone 33 then controls the loudspeaker voice coil 414 through the anti noise circuit 34, which physically may be housed in a corner of the tube 410.

Microphone tube 427 serves as a delay line and has a length which produces a time delay which causes the anti wave and the acoustic wave to be in phase at $Z_3$. Additional time delay can be produced by lengthening the path of tube 427, and/or by positioning the microphone 33 at a different location either closer to or farther away from the loudspeaker. The longitudinal location of the microphone 33 relative to the opening 430 may be at any position including in advance of, co-planar with, or following (as illustrated) the opening 430. This provides a wide variety of time delay configurations such that the tube 427 eliminates entirely the necessity for delay line 39 of FIG. 1.

The acoustic output from diaphragm 416 may undesirably include a backward component which will propagate from position $Z_2$ to position $Z_1$. If microphone 33 is perfectly unidirectional, this backward travelling anti wave will not produce any false output from the system. However, when the microphone is not perfectly unidirectional then an electrical feedback path is added around source 34 to cancel the resulting output from microphone 33 at the time that the backward component reaches the microphone. For this purpose, microphone 33 is coupled through a positive input of a summing junction 432 to the anti noise source 34. The feedback path includes a feedback resistor 433 and a delay line 434 in series between the output of anti noise source 34 and a negative input of the summing junction 432.

The time delay produced by delay line 434 is selected to be equal to the time delay for the backward wave to propagate from position $Z_2$ to the active transducer surface of microphone 33. This time delay generally will be different than the time delay, if any, for the anti noise source 34, due to the geometry of acoustic tube 427. The value of resistor 433 is selected so that the electrical subtraction input to summing junction 432 equals the electrical output of microphone 33 which is produced by the backward wave. The feedback path is very useful in preventing acoustic feedback, and can be used with a unidirectional microphone which does not have a true zero output for a wave travelling 180° from its sensitive axis. The feedback path can be incorporated in the previous embodiments for the general purpose of eliminating the effects of backward waves caused by the acoustic transmitter and/or by scattering due to a change in cross section prior to position $Z_3$.

GROUND MUFFLER/SILENCER FOR JET ENGINE

For non-airborne or ground use, various noise attenuation apparatus has been provided to silence jet engines during maintenance and testing of the engines and aircraft systems. The ambient pressure conditions at both the intake, and jet exhaust must be comparable or at least simulate atmospheric conditions. For example, there should be substantially no back pressure in the region of the jet exhaust in order to check true engine running characteristics. It is often desirable that such apparatus be portable, self-restraining, and incorporate an engine sealing adaptor to accommodate different engine nacelles and center lines.

The various embodiments previously described may be incorporated in a ground muffler/silencer to entirely replace and/or augment prior acoustic attenuation apparatus. For illustration, three types of anti noise duct apparatus are utilized in FIG. 16. The acoustic transmitters used therein take the form of modulated air flow speakers, either of the ambient or offset type, when the applicant's cancellation method is to entirely replace prior attenuation techniques. However, the acoustic transmitters can take the form of dynamic loudspeakers and the like when the applicant's cancellation method is to supplement a muffler/silencer utilizing conventional acoustic attenuation techniques. For example, anti noise ducts with dynamic loudspeakers can be added to the output side of existing mufflers/silencers to drastically lower the significant sound power levels which existing devices pass to the atmosphere, since conventional attenuation techniques can bring the noise output of these devices down to within the output range of a dynamic loudspeaker. Various types of apparatus, both conventional and as taught herein, may be combined and mixed as appropriate for a particular installation.

Turning to FIG. 16, an exemplary jet engine 440 includes an air intake 442 and an air outlet 444 which may or may not combine cold flow and hot flow in the case of a turbofan engine. Where cold flow discharges from a forward fan outlet, the ground muffler may be modified in a known manner to add a sealing adapter which extends forwardly to mate with the fan outlet. An intake suppressor 450 attenuates compressor noise at the engine air intake opening 442. An outlet suppressor 452 attenuates the pure jet noise and rotating machinery noise produced by the engine. Either or both of the suppressors 450 and 452 may be portable or mobile, and may include structure for compensating for any misalignment between the suppressors and the engine.

Intake suppressor 450 includes a plurality of vertically disposed intake tubes open for the reception of air, in the form of anti noise ducts 400 disclosed in FIGS. 13–15. The $Z_3$ end openings 420 are disposed upwardly for admittance of air which flows through the tubes to a lower duct 456 which mates with the openings 404 shown in FIG. 13. A plurality of direction changing vanes 458 direct the incoming air into a lateral tubular sealing adapter 460 which surrounds the air intake 442 and directs the air from vanes 458 into the engine 440. It will be appreciated that compressor noise is cancelled due to the operation of the anti noise system. If the engine 440 includes an anti noise system in its intake, such as shown in FIGS. 3–6, intake suppressor 450 may not be required.

Outlet suppressor 452 is useful for any engine since a certain amount of pure jet noise will always be formed in the atmosphere to the rear of the engine. Suppressor 452 includes an adapter 470 for sealing engagement with the engine exhaust 444, an augmenter 472 for admitting secondary air, and a conventional mixer-diffuser section 474 for comingling the secondary air with the jet exhaust. Section 474 may include a water spray for cooling the jet gases. Finally, a vertically disposed stack 476 vents the exhaust to the atmosphere through a plurality of vertically disposed anti noise ducts.

Augmenter 472 comprises a plurality of anti noise ducts 480 surrounding a center tube 482 which directs the exhaust to the mixer-diffuser 474. Each duct 480 may be similar to the anti noise ducts of FIGS. 4 and 5, and thus the side walls are formed by vanes 130. Within the ducts 480, a vane 140 (not seen in FIG. 16) is located directly adjacent a modulated air flow speaker 136 therefore. Thus, the anti noise ducts 480 allow the entrance of secondary air, but cancel undesirable noise which would otherwise propagate outward from the ducts. A pressure supply line 484 supplies the speakers 136 with air at a pressure offset from atmospheric pressure, as available at a bleed port 486 in center tube 482. Thus, the pressure of the jet exhaust is tapped to provide the pressure source for the modulated air flow speakers. Supply line 484 may include a pressure reduction means, if desired. The pressure supply line 484 may also supply air to the intake silencer 450 and the anti noise system in the vertical stack 476, if those units include modulated air flow speakers therein.

The circular mixer-diffuser 474 merges with a square or rectangular flaring member 490 which mates with the square stack 476. A plurality of direction changing vanes 492 in stack 476 direct the stream of the engine gases vertically towards a plurality of anti noise ducts which open to the atmosphere. The anti noise ducts are formed by anti noise units 350 of FIGS. 9–12 (but constructed without the transition surface 392 and mating rear circular wall 390), and thus cancel the pure jet noise carried with the jet discharge stream.

The above described techniques are equally usable for ground pens and hangers. Furthermore, all of the various embodiments described herein, and many of the individual components thereof, may be interchanged and combined in many configurations following the above teachings. For example, the anti noise ducts can be placed in cascade, or in back-to-back relation to cancel sound waves propagating along opposed directions. Other modifications and changes can be made within the scope of the invention.

I claim:

1. A method for attenuating a predetermined range of frequencies within an acoustic wave propagating along different vectors through a medium, comprising the steps of:

generating an anti wave limited to only said predetermined range of frequencies and of mirror symmetry with respect to said acoustic wave, propagating said anti wave in said medium along a given vector which is at a skew with respect to one of said different vectors, altering a vector of at least one of said waves to produce substantially coinciding vectors of propagation only for the predetermined range of frequencies, and aligning the wavefront of at least one of said waves to produce substantially coinciding wavefronts.

2. The method of claim 1 wherein the step of altering comprises confining said at least one wave to cause its wavefront to assume a predetermined shape which matches the shape of the wavefront of the other wave only for the predetermined range of frequencies.

3. The method of claim 2 wherein the predetermined shape comprises a plane wave having a (O,O) acoustic mode.

4. The method of claim 3 wherein the step of confining includes propagating said at least one wave in a restricted space of predetermined cross-sectional area and of a minimum length of predetermined extend greater than the longest dimension of the cross-sectional area, said cross-sectional area being selected to produce a predetermined cut-off frequency below which propagation is confined to the (O,O) acoustic mode and above which propagation can occur in a $(m,n)$ acoustic mode, and selecting said predetermined cut-off frequency to be greater than the highest frequency acoustic wave which is to be attenuated, whereby the predetermined range of frequencies corresponds to all frequencies below the predetermined cut-off frequency.

5. The method of claim 1 wherein the step of generating includes detecting the acoustic wave and producing a signal corresponding thereto, filtering the signal to pass frequencies below said predetermined frequency and to attenuate frequencies above said predetermined frequency, said filtered signal forming said anti wave limited to only said predetermined range of frequencies, and the step of altering includes selectively altering the vector of at least one of said waves when having a frequency less than said preselected frequency and passing without alteration said at least one wave when having a frequency higher than said predetermined frequency, whereby the predetermined range of frequencies corresponds to all frequencies below the predetermined frequency.

6. A method for attenuating an acoustic wave propagating along different vectors through a medium, comprising the steps of:
   detecting the acoustic wave to produce an anti wave signal corresponding thereto,
   propagating in said medium along a given vector which is at a skew with respect to one of said different vectors an anti wave of mirror symmetry with respect to said acoustic wave by producing a flow of the medium at a pressure continuously offset from the ambient pressure of the medium, and modulating the flow in accordance with variations in said signal,
   altering a vector of at least one of said waves to produce substantially coinciding vectors of propagation, and
   aligning the wavefront of at least one of said waves to produce substantially coinciding wavefronts.

7. The method of claim 6 wherein the step of propagating further includes producing a second flow of the medium at a second pressure continuously offset from the ambient pressure of the medium and offset from the pressure of the first named flow, one of said flows being above ambient pressure and the other of said flows being below ambient pressure, modulating the second flow in accordance with variations in said signal, and combining the first named and second flows to produce ambient pressure in the absence of a variation in said signal and a pressure deviation above or below ambient pressure for variations above and below a reference level of the signal.

8. A system for attenuating an acoustic wave propagating through a medium which is sufficiently unconfined to allow different vectors of propagation of the acoustic wave, comprising:
   duct means having a pair of spaced apertures each open to said medium and a hollow passageway therebetween, the duct means being positionable to cause one of said apertures to intersect and direct the propagating acoustic wave through the passageway toward the other of said apertures, said passageway having a cross section of reduced size with respect to the cross section of the medium outside of the duct means and producing a duct cut-off frequency corresponding to the lowest order acoustic mode of propagation to confine the acoustic wave to a plane wavefront for frequencies below the duct cut-off frequency and of a predetermined vector of propagation;
   receiver means for generating a signal corresponding to the propagating acoustic wave;
   transmitter means responsive to said signal for generating in said passageway an interference wave of opposite pressure variation with respect to the acoustic wave and having a plane wavefront for frequencies below the duct cut-off frequency and of a predetermined vector of propagation to produce a propagating cancellation effect; and
   low pass filter means connecting said receiver means to said transmitter means and passing signals less than the duct cut-off frequency.

9. The system of claim 8 wherein the cross section of said hollow passageway is generally rectangular, and the longest width of the generally rectangular cross section is less than $c/2fc$ ) where $c$ is the local velocity of sound and $fc$ is the duct cut-off frequency.

10. The system of claim 8 wherein said transmitter means generates said interference wave with a pressure variation of mirror symmetry with respect to the pressure variation of the acoustic wave, said receiver means, low pass filter means and transmitter means having a transmission time equal to the propagation time in the medium for the distance between the receiver means and the transmitter means to cause the wavefront of the interference wave to be in-phase with the wavefront of the acoustic wave.

11. The system of claim 10 wherein said receiver means comprises microphone means having a sensitive surface responsive to an acoustic pressure variation to generate said signal, and delay tube means separate from said passageway for coupling said sensitive surface to the medium, said delay tube means forming an acoustic time delay which forms a part of said transmission time.

12. A system for attenuating an acoustic wave propagating through a medium, comprising:
   duct means having a pair of spaced apertures each open to said medium and a hollow passageway therebetween, one of said apertures being positionable to intersect the propagating acoustic wave to cause the acoustic wave to propagate through the passageway toward the other of said apertures, said passageway having a cross section of predetermined size to confine the acoustic wave to a wavefront of predetermined shape, said duct means allowing a backward wave to propagate through the passageway in a direction opposite to the propagating acoustic wave;
   means for generating an interference wave having a wavefront of said predetermined shape including
   receiver means contiguous with the passageway and responsive to said acoustic wave for generating a signal corresponding to the propagating acoustic wave,
   diaphragm means movable in response to said signal to produce at a transmitter output an opposite pressure variation with respect to the acoustic wave,
   mounting means locating said transmitter output generally facing said other aperture to direct the interference wave through said passageway with a vector direction toward said other aperture and away from said one aperture, and
   means for preventing the backward wave from producing at the transmitter output any pressure variation.

13. The system of claim 12 wherein the diaphragm means comprises an annular surface surrounding an open central portion, said mounting means locating said annular surface in a wall defining said passageway to cause the open central portion to be contiguous with the passageway.

14. The system of claim 12 wherein said receiver means is located within said duct means and comprises a unidirectional microphone having a sensitive axis and said preventing means directs the sensitive axis toward said one aperture to orient said unidirectional microphone to discriminate against backward acoustic waves entering said passageway through said other aperture.

15. The system of claim 12 including amplifier means having an input coupled to said receiver means and an output coupled to said diaphragm means, said diaphragm means generating the backward wave which undesirably propagates through said passageway to said receiver means to produce a false output, and the preventing means corresponds to feedback means for coupling said output to said input and having an impedance to cause a feedback signal to cancel the false output from said receiver means.

16. A system for attenuating an acoustic wave propagating through a medium which is sufficiently unconfined to allow different vectors of propagation of the acoustic wave, comprising:

duct means having a pair of spaced apertures each open to said medium and a hollow passageway therebetween with central core means located within a center area of the passgeway, the duct means and the central core means defining therebetween a surrounding passageway, the duct means being positionable to cause one of said apertures to intersect and direct the propagating acoustic wave through the surrounding passageway toward the other of said apertures, said surrounding passageway having a cross section of predetermined size to confine the acoustic wave to a wavefront of predetermined shape and of a predetermined vector of propagation;

receiver means for generating a signal corresponding to the propagating acoustic wave; and transmitter means including diaphragm means movable in response to said signal to produce at a transmitter output a pressure variation related thereto, and transmitter mounting means for locating said transmitter output within said central core means and oriented to disperse the pressure variations into the surrounding passageway to generate an interference wave of opposite pressure variation with respect to the acoustic wave and having a wavefront of the same predetermined shape and predetermined vector of propagation to produce a propagating cancellation effect.

17. The system of claim 16 wherein said duct means includes longitudinally extending wall means dividing aid passageway into a plurality of separate ducts which surround said central core means, and said transmitter mounting means includes a plurality of tube means each opening into a different one of said plurality of separate ducts for coupling the common transmitter output to each of the separate ducts.

18. The system of claim 16 wherein said central core means locates said transmitter output in the center of the cross section of said passageway and oriented to disperse the interference wave throughout the cross section of the passageway and toward said other aperture.

19. The system of claim 18 including cone-shaped disperser means spaced coaxially from said transmitter output and located within said passageway between said transmitter output and said other aperture to disperse pressure variations from the transmitter output into a surrounding interference space defined by the disperser means and the walls defining the passageway of the duct means.

20. In a gas breathing engine having rotating machinery creating a pressure gradient in a passageway which opens external to the engine and undesirably creating in said passageway acoustic noise which unless attenuated will propagate external to the engine, apparatus for attenuating the acoustic noise, comprising:

receiver means for detecting said acoustic noise and generating an audio signal corresponding thereto, modulated gas flow speaker means having a speaker inlet for receiving gas at a pressure offset from ambient pressure at a speaker outlet, and a modulator for coupling said speaker inlet to said speaker outlet and responsive to an audio signal for modulating a flow of the gas, bleed port means located in said passageway and open to gas at said offset pressure, tubing means connecting said bleed port means to said speaker inlet for supplying the gas to said modulator, anti noise means coupling said receiver means to said modulator to produce at said speaker outlet an interference wave of mirror symmetry with respect to said acoustic noise, and coherent propagation means associated with said speaker outlet and said passageway for superimposing the acoustic noise and the interference wave to produce interference cancellation therebetween.

21. The apparatus of claim 20 wherein said coherent propagation means comprises a plurality of duct means each of cross section less than the cross section of said passageway and located in said passageway in abutting relation to force the acoustic noise to flow through the plurality of duct means during travel through the passageway, each duct means having a size to redirect the acoustic noise into a wavefront of predetermined shape, and said outlet being contiguous with said plurality of duct means to cause the interference wave to have a similar predetermined shape.

22. The apparatus of claim 21 for a gas turbine engine wherein said plurality of duct means comprise a plurality of vanes for dividing said passageway into a plurality of separate ducts, the rotating machinery comprises rotating blades which produce acoustic noise having a spinning pressure variation of one or more lobes which rotate while propagating through said passageway, said plurality of vanes being spaced to convert said spinning pressure variation into separate plane waves of (O,O) mode and each of which propagate independent of the propagation of the remaining plane waves of (O,O) mode in the remaining of the separate ducts, said modulated gas flow speaker means comprises a plurality of modulated gas flow speaker devices each associated with a different duct, said receiver means comprises a plurality of transducers each associated with a different duct, and said anti noise means independently couples each transducer to the modulated gas flow speaker device associated with the same duct.

23. The apparatus of claim 22 wherein said passageway comprises an annular duct located between an outer cylindrical housing and a coaxial inner cylindrical housing, said gas flowing parallel to the coaxial housings and through the annular duct under control of the rotating blades, each of said vanes extending radially from the inner housing of the outer housing with adjacent vanes defining therebetween said ducts, shroud means forming a wall between said inner and said outer cylindrical housings to divide each duct into at least two sections in order to increase the duct cut-off frequency for all modes above the (O,O) mode, and low pass filter means located between said transducers and said modulated gas flow speaker devices for attenuating audio signals greater than said duct cut-off frequency.

24. The apparatus of claim 20 wherein said coherent propagation means is formed by adjacent vanes logated in said passageway to define tehrebetween an anti noise duct which alters the vector of the acoustic noise, said modulated gas flow speaker means being mounted external to said passageway, and tube means coupling the outlet of said modulated gas flow speaker to the anti noise duct.

25. The apparatus of claim 24 wherein said tube means comprises a speaker vane spaced generally equidistant between the adjacent vanes forming said anti noise duct and having an aperture within said speaker vane leading to a speaker opening for coupling the interference wave to a generally center position within the anti noise duct.

26. The apparatus of claim 25 wherein said receiver means comprises a microphone having an active transducer surface, said microphone being mounted external to said anti noise duct, and said speaker vane includes an elongated microphone tube for coupling said active transducer surface to a microphone opening in said speaker vane, said micropnone opening being on an opposite facing surface to the speaker opening.

27. The apparatus of claim 20 wherein said modulated gas flow speaker means includes chamber means having a plurality of slots and port means forming said inlet for coupling the chamber means to said tubing means, said modulated comprises a movable diaphragm having a plurality of slots generally offset from the slots of said chamber means and movable into overlapping positions to pass an amount of gas dependent on the position of the diaphragm, magnetic flux generator means for establishing a magnetic flux field, voice coil means located on said diaphragm and within the magnetic flux field, said voice coil means being coupled to said source of audio signal to prodcue movement of the voice coil and attached diaphragm with the extent of movement being proportional to the signal to cause the amount of gas passed through the overlapping slots of the chamber means and diaphragm to be proportional to said signal.

28. The apparatus of claim 27 wherein said chamber means is annular and has a coaxial inner wall and outer wall, said port means being located on said outer wall, said plurality of slots surrounding said inner wall to pass the gas to a hollow central core, said diaphragm being cylindrical and located in said hollow central core for passage of gas through the slots to a hollow interior of the cylindrical diaphragm, and tube means forming said outlet for coupling the hollow interior of the cylindrical diaphragm to an opening for the acoustic waves.

29. A system for attenuating an acoustic wave propagating through a medium, comprising:
source means including receiver means for detecting said acoustic wave, transmitter means responsive to said receiver means for producing an anti wave which interferes with said acoustic wave to produce a cancellation effect, and time delay means for varying the transmission time of the source means to change the position of said anti wave in said medium,
sensing means for sensing a condition which indicates misalignment between the anti wave and the acoustic wave which were initially aligned, and
correction means responsive to said sensing means for automatically varying said time delay means to again align the anti wave with the acoustic wave.

30. The system of claim 29 wherein said sensing means monitors a condition of said medium which changes with changes in the velocity of sound in said medium, said correction means controlling said time delay means to cause the transmission time of said source means to equal the transmission time in the medium between the receiver means and the transmitter means.

31. The system of claim 30 wherein said sensing means monitors a temperature T of said medium, said correction means comprises a function generator for controlling the transmission time of said source means in proportion to $$\frac{1}{K_1 \sqrt{K_2 + T}}$$

where $K_1$ and $K_2$ are constants.

32. A system for attenuating an acoustic wave propagating through a medium, comprising:
receiver means positionable to intersect the acoustic wave for generating a receiver signal corresponding thereto,
transmitter means spaced from said receiver means and responsive to an amplified signal for generating an interference wave which propagates toward an interference zone spaced away from the receiver means and the transmitter means, generation of the interference wave undesirably creating a traveling wave which propagates to said receiver means and produces a false signal not resulting from the acoustic wave, and
amplifier means having an amplifier input coupled to said receiver means and an amplifier output coupled to said transmitter means for amplifying the receiver signal to generate the amplified signal, including feedback means generating a feedback signal having a time delay corresponding to the propagation time of the traveling wave for cancelling the false signal produced when the traveling wave reaches the receiver means.

33. A system of claim 32 wherein the feedback means includes time delay means coupled to the amplifier output and having a time delay corresponding to the propagation time and an impedance which reduces the value of the feedback signal to equal the value of the false receiver signal produced by the traveling wave, and subtraction means for subtracting the receiver signal and the feedback signal.

34. The system of claim 32 including a duct having an elongated passageway with the acoustic wave propagating therethrough, an acoustically downstream section of the passageway corresponding to the interference zone, said receiver means being positioned acoustically upstream from said interference zone to detect the acoustic wave before it propagates to the interference zone, and the transmitter means being located intermediate the receiver means and the interference zone and having a transmitter output which directs the interference wave generally toward the interference zone, the passageway extending between the transmitter output and the receiver means corresponding to an undesired acoustic path for the traveling wave.

35. A system for attenuating an acoustic wave propagating through a medium, comprising:
- a plurality of separate ducts surrounding a central core and each having a separate passageway with an opening contiguous with the central core;
- receiver means for generating a signal corresponding to an acoustic wave propagating through at least one of the separate passageways; and
- transmitter means located in said central core and responsive to said signal for generating an interference wave which propagates through all of the contiguous opening into the plurality of separate passageways to produce cancellation between the interference wave and the acoustic wave propagating in the associated passageway.

36. The system of claim 35 wherein each of the plurality of ducts has an interference zone located in the associated pasageway and spaced acoustically downstream from the opening contiguous with the central core, each of the opening being defined by walls shaped to direct the interference wave through the associated passageway with a vector direction towards the interference zone, and the receiver means having a receiver aperture open to at least one of the passageways and spaced acoustically upstream with respect to the contiguous openings.

37. The system of claim 36 wherein the central core has a receiver chamber containing the receiver means and at least one receiver aperture contiguous with at least one of the passageways, and the central core has a transmitter chamber located generally between the receiver chamber and the interference zones and separate from the receiver chamber for containing the transmitter means.

38. The system of claim 35 wherein the plurality of separate ducts are formed by a unit having four exterior walls which join perpendicularly to form a rectangular or square exterior cross-section and a plurality of interior walls extending between the exterior walls and the central core to define the separate passageways forming each separate duct, the exterior walls and the interior walls and the central core defining at one end of the unit a plurality of apertures positionable to intersect the propagating acoustic wave to cause the acoustic wave to separate and propagate separately through the plurality of passageways towards the opposite end of the unit, the opposite end of the unit having corresponding apertures open to the medium, and the transmitter means being located in said central core between the ends of the unit.

39. The system of claim 38 wherein an exterior part of the central core which intersects the propagating acoustic wave has surfaces which taper smoothly toward a point to minimize the introduction of bending waves.

* * * * *